(12) United States Patent
Hiasa et al.

(10) Patent No.: US 10,794,482 B2
(45) Date of Patent: Oct. 6, 2020

(54) SHIFTING CONTROL APPARATUS FOR VEHICULAR AUTOMATIC TRANSMISSION

(71) Applicant: TOYOTA JIDOSHA KABUSHIKI KAISHA, Toyota-shi, Aichi (JP)

(72) Inventors: Yasuhiro Hiasa, Miyoshi (JP); Ichiro Isobe, Okazaki (JP); Tooru Matsubara, Toyota (JP); Kazuyuki Shiiba, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 16/104,237

(22) Filed: Aug. 17, 2018

(65) Prior Publication Data

US 2019/0063603 A1 Feb. 28, 2019

(30) Foreign Application Priority Data

Aug. 22, 2017 (JP) ................ 2017-159807

(51) Int. Cl.

| | |
|---|---|
| *F16H 61/70* | (2006.01) |
| *B60K 6/445* | (2007.10) |
| *B60K 6/543* | (2007.10) |
| *B60K 6/547* | (2007.10) |
| *F16H 61/02* | (2006.01) |
| *F16H 61/66* | (2006.01) |

(Continued)

(52) U.S. Cl.
CPC ........... *F16H 61/702* (2013.01); *B60K 6/365* (2013.01); *B60K 6/445* (2013.01); *B60K 6/543* (2013.01); *B60K 6/547* (2013.01); *B60W 20/30* (2013.01); *F16H 3/66* (2013.01); *F16H 3/728* (2013.01); *F16H 37/0826* (2013.01); *F16H 61/0213* (2013.01); *F16H 61/0403* (2013.01); *F16H 61/66* (2013.01); *B60Y 2200/92* (2013.01); *F16H 59/18* (2013.01); *F16H 59/72* (2013.01); *F16H 61/686* (2013.01); *F16H 2059/183* (2013.01); *F16H 2061/6603* (2013.01); *F16H 2200/0043* (2013.01); *F16H 2200/2007* (2013.01); *F16H 2200/2041* (2013.01); *F16H 2200/2066* (2013.01); *F16H 2200/2082* (2013.01)

(58) Field of Classification Search
CPC ................ F16H 2061/0414; F16H 2061/6601
See application file for complete search history.

(56) References Cited

FOREIGN PATENT DOCUMENTS

JP 2006-321392 A 11/2006

*Primary Examiner* — Timothy Hannon
(74) *Attorney, Agent, or Firm* — Oliff PLC

(57) ABSTRACT

A shifting control apparatus includes an overall-speed-position shifting control portion including: a synchronous shifting control portion to implement a synchronous control of shifting actions of the vehicular automatic transmission and the step-variable transmission portion to respective target ones of the overall speed positions and the gear positions, such that a moment of generation of a command to establish the target overall speed position is delayed with respect to a moment of generation of a command to establish the target gear position, so that the shifting actions take place in synchronization with each other, irrespective of different control response times of the shifting actions; and a multiple-step shifting control portion to command the synchronous shifting control portion such that the vehicular automatic transmission performs a shift-up action from a present one of the overall speed position to the target overall speed position through at least one intermediate overall speed position intermediate.

10 Claims, 11 Drawing Sheets

(51) Int. Cl.
*F16H 37/08* (2006.01)
*F16H 3/72* (2006.01)
*B60K 6/365* (2007.10)
*F16H 3/66* (2006.01)
*F16H 61/04* (2006.01)
*B60W 20/30* (2016.01)
*F16H 61/686* (2006.01)
*F16H 59/18* (2006.01)
*F16H 59/72* (2006.01)

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

| | OVERALL SPEED POSITIONS AVAILABLE | | | 1 | 2 | 3 | 4 | 5 | 6 | 7 | 8 | 9 | 10 |
|---|---|---|---|---|---|---|---|---|---|---|---|---|---|
| AT GEAR POSITIONS | AUTOMATIC SHIFTING | NORMAL OIL TEMP. | SHIFT-UP | | 1 | | | 2 | | | 3 | | 4 |
| | | | SHIFT-DOWN | 1 | | | 2 | | | 3 | | | 4 |
| | MANUAL SHIFTING | NORMAL OIL TEMP. | SHIFT-UP | | 1 | | | 2 | | | | 3 | |
| | | | SHIFT-DOWN | 1 | | | 2 | | | 3 | | | 4 |
| | | HIGH OIL TEMP. | SHIFT-UP | | | 1 | | | | 2 | | | 3 |
| | | | SHIFT-DOWN | | | 1 | | | | 2 | | | 3 |

SHIFTING CONTROL APPARATUS FOR VEHICULAR AUTOMATIC TRANSMISSION

This application claims priority from Japanese Patent Application No. 2017-159807 filed on Aug. 22, 2017, the disclosure of which is herein incorporated by reference in its entirety.

FIELD OF THE INVENTION

The present invention relates in general to a shifting control apparatus for a vehicular automatic transmission, and more particularly to a shifting control apparatus for a vehicular automatic transmission provided with an electrically controlled continuously variable transmission portion and a mechanically operated step-variable transmission portion which are disposed in series with each other.

BACKGROUND OF THE INVENTION

There is well known a vehicular automatic transmission having (a) an electrically controlled continuously variable transmission portion operable to transmit a rotary motion of a drive power source to an intermediate power transmitting member such that a speed ratio of an operating speed of the drive power source to a rotating speed of the intermediate power transmitting member is continuously varied with a torque control by a differential motor/generator, and (b) a mechanically operated step-variable transmission portion which is disposed between the intermediate power transmitting member and drive wheels of a vehicle, and which has a plurality of mechanically established gear positions having respective different ratios of the rotating speed of the intermediate power transmitting member to an output speed of the step-variable transmission portion. JP-2006-321392A discloses an example of this type of vehicular automatic transmission, and a shifting control apparatus for the automatic transmission, which is configured to reduce a shifting shock of the mechanically operated step-variable transmission portion due to speed changes in an inertia phase of its shifting action, by implementing a shifting action of the electrically controlled continuously variable transmission portion while the operating speed of the drive power source is substantially kept unchanged, so that the inertia phase of the shifting action of the mechanically operated step-variable transmission portion is initiated.

However, this shifting control apparatus has difficulty to completely prevent generation of the shifting shock of the mechanically operated step-variable transmission portion, and suffers from a risk that an operator of a vehicle provided with the automatic transmission is given a discomfort due to the shifting shock even when the shifting shock is not so serious, since the operating speed of the drive power source is kept substantially constant.

SUMMARY OF THE INVENTION

The present invention was made in view of the background art described above. It is therefore an object of the present invention to provide a shifting control apparatus for a vehicular automatic transmission having an electrically controlled continuously variable transmission portion and a mechanically operated step-variable transmission portion, which shifting control apparatus permits further reduction of discomfort given to the operator of the vehicle due to the shifting shock of the mechanically operated step-variable transmission portion in the process of its shifting action.

The object indicated above is achieved according to the following modes of the present invention:

According to a first mode of the invention, there is provided a shifting control apparatus for a vehicular automatic transmission having (a) an electrically controlled continuously variable transmission portion configured to transmit a rotary motion of a drive power source to an intermediate power transmitting member such that a speed ratio of an operating speed of the drive power source to a rotating speed of the intermediate power transmitting member is continuously varied with a torque control by a differential motor/generator, and (b) a mechanically operated step-variable transmission portion which is disposed between the intermediate power transmitting member and drive wheels of a vehicle, and which has a plurality of mechanically established gear positions having respective different ratios of the rotating speed of the intermediate power transmitting member to an output speed of the step-variable transmission portion, the shifting control apparatus comprising (c) an overall-speed-position shifting control portion configured to control the electrically controlled continuously variable transmission portion, so as to establish a plurality of overall speed positions of the vehicular automatic transmission having respective different values of a speed ratio which is a ratio of the operating speed of the drive power source to an output speed of the mechanically operated step-variable transmission portion, (d) wherein the overall-speed-position shifting control portion includes: (d-1) a synchronous shifting control portion configured to implement a synchronous control of shifting actions of the vehicular automatic transmission and the mechanically operated step-variable transmission portion to respective target ones of the plurality of overall speed positions and the plurality of gear positions, such that a moment of generation of a command to establish the target overall speed position is delayed with respect to a moment of generation of a command to establish the target gear position, so that the shifting actions take place in synchronization with each other, irrespective of different control response times of the shifting actions; and (d-2) a multiple-step shifting control portion configured to command the synchronous shifting control portion such that the vehicular automatic transmission performs a shift-up action (i.e., shifting to a speed position having lower gear ratio) from a present one of the overall speed position to the target overall speed position through at least one intermediate overall speed position intermediate between the present and target overall speed positions.

It is noted that the synchronous shifting actions to establish the target AT gear position and overall speed position are interpreted to mean that the inertia phases of the two shifting actions (in which a rotating speed of an input-side rotary member varies with a change of the speed ratio) at least partially overlap each other. It is also noted that the control response time of the two shifting actions is a delay time from a moment of generation of a command to establish the target AT or overall speed position to a moment of initiation of the inertia phase.

According to a second mode of the invention, the shifting control apparatus according to the first mode of the invention is configured such that the multiple-step shifting control portion includes a multiple-step shifting determining portion configured to determine, according to a predetermined condition for implementing a multiple-step shifting control, whether the vehicular automatic transmission should be initially shifted to the at least one intermediate overall speed position.

According to a third mode of the invention, the shifting control apparatus according to the second mode of the invention is configured such that the predetermined condition for implementing the multiple-step shifting control is formulated to implement the multiple-step shifting control to initially shift the vehicular automatic transmission to the at least one intermediate overall speed position, where a speed of releasing of an accelerator pedal provided on the vehicle is equal to or higher than a predetermined upper limit, where an amount of reduction of an operation amount of the accelerator pedal is equal to or larger than a predetermined upper limit, or where the operation amount of the accelerator pedal after its releasing operation is equal to or smaller than a predetermined lower limit. In this respect, it is noted that the multiple-step shifting determining portion is required to make a determination with respect to at least one of the speed of releasing of the accelerator pedal, the amount of reduction of the operation amount of the accelerator pedal, and the operation amount of the accelerator pedal after its releasing operation.

According to a fourth mode of the invention, the shifting control apparatus according to the second or third mode of the invention is configured such that the mechanically operated step-variable transmission portion is hydraulically shifted to a selected one of the gear positions with a working fluid, and the predetermined condition for implementing the multiple-step shifting control is formulated to implement the multiple-step shifting control to initially shift the vehicular automatic transmission to the at; least one intermediate overall speed position, where a temperature of the working fluid is equal to or lower than a predetermined lower limit.

According to a fifth mode of the invention, the shifting control apparatus according to any one of the first through fourth modes of the invention is configured such that the multiple-step shifting control portion includes an intermediate overall speed position selecting portion configured to select the at least one intermediate overall speed position according to a running state of the vehicle, where the overall speed positions are present between the present and target overall speed positions.

According to a sixth mode of the invention, the shifting control apparatus according to the fifth mode of the invention is configured such that the intermediate overall speed position selecting portion selects the at least one intermediate overall speed position, according to the speed of releasing of the accelerator pedal, the amount of reduction of the operation amount of the accelerator pedal, and the operation amount of the accelerator pedal after its releasing operation as the running state of the vehicle, such that the selected at least one intermediate overall speed position is closer to the target overall speed position (i.e., to a speed position having lower gear position) when the speed of releasing of the accelerator pedal is relatively high than when the speed of releasing is relatively low, when the amount of reduction of the operation amount of the accelerator pedal is relatively large than when the amount of reduction is relatively small, or when the operation amount of the accelerator pedal after its releasing operation is relatively small than when the operation amount is relatively large.

According to a seventh mode of the invention, the shifting control apparatus according to the fifth or sixth mode of the invention is configured such that the number of the overall speed positions of the vehicular automatic transmission is larger than the number of the gear positions of the mechanically operated step-variable transmission portion, and a plurality of the overall speed positions are assigned to one of the gear positions, and the intermediate overall speed position selecting portion selects the at least one intermediate overall speed position from the overall speed positions assigned to the present gear position, in a running state of the vehicle in which a shifting shock of the mechanically operated step-variable transmission portion is likely to be generated.

According to an eighth node of the invention, the shifting control apparatus according to any one of the fifth through seventh modes of the invention is configured such that the number of the overall speed positions of the vehicular automatic transmission is larger than the number of the gear positions of the mechanically operated step-variable transmission portion, and a plurality of the overall speed positions are assigned to one of the gear positions, and the intermediate overall speed position selecting portion selects the at least one intermediate overall speed position outside a range of the overall speed positions assigned to the present gear position, in a running state of the vehicle in which an operator of the vehicle is likely to feel that the operating speed of the drive power source is kept at a relatively high value for an excessively long length of time.

According to a ninth mode of the invention, the shifting control apparatus according to any one of the first through eighth modes of the invention is configured such that the multiple-step shifting control portion includes a multiple-step shifting commanding portion configured to command the vehicular automatic transmission to be shifted up to the at least one intermediate overall speed position, at a predetermined timing after a moment of determination to shift up the vehicular automatic transmission to the target overall speed position.

According to a tenth mode of the invention, the shifting control apparatus according to the ninth mode of the invention is configured such that the multiple-step shifting commanding portion commands the vehicular automatic transmission to be shifted up to the at least one intermediate overall speed position, immediately after the moment of determination to shift up the vehicular automatic transmission to the target overall speed position. It is noted that the expression "immediately after the moment of determination" is interpreted to mean that the at least one intermediate overall speed position is selected as soon as possible, and that the vehicular automatic transmission is shifted to the selected at least one intermediate overall speed position as soon as possible.

In the shifting control apparatus for the vehicular automatic transmission, which is configured according to the first mode of the invention, the plurality of overall speed positions of the vehicular automatic transmission having the respective different speed ratios of the operating speed of the drive power source to an output speed of the mechanically operated step-variable transmission portion are established by controlling the electrically controlled continuously variable transmission portion, so that the operating speed of the drive power source is variable in steps by shifting the vehicular automatic transmission from one of the overall speed positions to another. Accordingly, the vehicular automatic transmission as a whole can be shifted in a manner like a manner of shifting of a mechanically operated step-variable transmission, as felt by an operator of the vehicle. Further, the synchronous control of the shifting actions of the vehicular automatic transmission and the mechanically operated step-variable transmission portion to the respective target overall speed position and gear position is implemented such that the moment of generation of the command to establish the target overall speed position is delayed with respect to the moment of generation of the command to establish the target gear position, so that the shifting actions take place in synchronization with each other, irrespective of the different control response times of the shifting actions. Accordingly, the degree of discomfort given to the vehicle operator due to different timings of the two shifting actions and the shifting shock of the mechanically operated step-variable transmission portion is reduced, and the drivability of the vehicle is improved. Namely, the control response time of the shifting action of the vehicular automatic transmission performed by the electrically controlled continuously variable transmission portion is shorter than the control response time of the shifting action of the mechanically operated step-variable transmission portion, so that simultaneous generation of the commands to establish the target overall speed position and gear position causes a difference between a state of change of the operating speed of the drive power source in the process of the shifting action of the vehicular automatic transmission and a state of change of the rotating speed of the intermediate power transmitting member in the process of the shifting action of the mechanically operated step-variable transmission portion, whereby the vehicle operator may be given discomfort due to this difference. In addition, since the shifting actions of the vehicular automatic transmission and the mechanically operated step-variable transmission portion to the target overall speed position and gear position take place in synchronization with each other, the shifting action of the mechanically operated step-variable transmission portion is performed together with: a change of the operating speed of the drive power source, so that the vehicle operator is unlikely to feel uncomfortable with a shifting shock of the step-variable transmission portion, even if the shifting shock is generated.

On the other hand, where the shift-up action of the vehicular automatic transmission to the target overall speed position is controlled to take place in synchronization with the shift-up action of the mechanically operated step-variable transmission portion, as described above, the operating speed of the drive power source is kept at a relatively high value until the shift-up action of the step-variable transmission portion is initiated, for example, when the step-variable transmission portion is automatically shifted up as a result of a releasing operation of an accelerator pedal, or manually shifted up as a result of an operation of a shift lever or any other manually operated member by the vehicle operator. In this case, there are a risk that the vehicle operator feels that the operating speed of the drive power source is kept at a relatively high value for an excessively long length of time (that the operating speed of the drive power source is not quickly lowered in spite of the releasing operation of the accelerator pedal or the manual operation to shift up the step-variable transmission portion), and a risk of deterioration of the fuel economy (energy efficiency) of the drive power source. There is also a risk that the vehicle operator feels uncomfortable with a difference of the control response of the synchronous shifting actions of the vehicular automatic transmission and the step-variable transmission portion, with respect to that of a shifting action of the vehicular automatic transmission which takes place alone without a concurrent shifting action of the step-variable transmission portion. In view of these risks, the overall-speed-position shifting control portion includes the multiple-step shifting control portion configured to command the synchronous shifting control portion such that the vehicular automatic transmission performs the shift-up action from the present overall speed position to the target overall speed position through at least one intermediate overall speed position. Thus, the vehicular automatic transmission is initially shifted up to the intermediate overall speed position or positions, before it is eventually shifted up to the target overall speed position, so that the operating speed of the drive power source is lowered at an earlier point of time, whereby the risk of the vehicle operator feeling that the operating speed is kept at the relatively high value for the excessively long length of time, and the risk of deterioration of the fuel economy of the drive power source are reduced, together with an improvement of the drivability of the vehicle.

According to the second mode of the invention wherein the multiple-step shifting determining portion determines, according to the predetermined condition for implementing the multiple-step shifting control, whether the vehicular automatic transmission should be initially shifted to the at least one intermediate overall speed position, the multiple-step shifting control is implemented only where there is the risk of the vehicle operator feeling that the operating speed of the drive power source is kept at the relatively high value for the excessively long length of time, or the risk of deterioration of the fuel economy of the drive power source, for example, where the speed of releasing of the accelerator pedal is higher than a predetermined upper limit, where the amount of reduction of the operation amount of the accelerator pedal is larger than a predetermined upper limit, or where the operation amount of the accelerator pedal after its releasing operation is smaller than a predetermined lower limit, as described above with respect to the third mode of the invention, or where the temperature of the working fluid used for the mechanically operated step-variable transmission portion is lower than a predetermined lower limit, as described above with respect to the fourth mode of the invention. Accordingly, it is possible to reduce the risk of the vehicle operator feeling that the operating speed of the drive power source is kept at the relatively high value for the excessively long length of time, and the risk of deterioration of the fuel economy of the drive power source, while adequately maintaining a high degree of drivability of the vehicle owing to the synchronous shifting actions of the vehicular automatic transmission and the mechanically operated step-variable transmission portion. Namely, it is considered that the vehicle operator expects that the operating speed of the drive power source quickly drops down as a result of the releasing operation of the accelerator pedal, where the speed of releasing of the accelerator pedal is higher than the predetermined upper limit, where the amount of reduction of the operation amount of the accelerator pedal is larger than the predetermined upper limit, or where the operation amount after the releasing operation of the accelerator pedal is smaller than the predetermined lower limit, as described above with respect to the third mode of the invention. Further, where the temperature of the working fluid is lower than the predetermined lower limit, as described above with respect to the fourth mode of the invention, the working fluid has a high degree of viscosity, so that there is a high possibility that the shifting action of the mechanically operated step-variable transmission portion has a relatively long control response time. In any one of the above-described cases, there are the risk of the vehicle operator feeling that the operating speed of the drive power source is kept at the relatively high value for the excessively long length of time, and the risk of deterioration of the fuel economy of the drive power source.

According to the fifth mode of the invention wherein the at least one intermediate overall speed position is selected according to the running state of the vehicle, it is possible to reduce the risk of the vehicle operator feeling the operating speed of the drive power source kept at the relatively high value for the excessively long length of time, and the risk of deterioration of the fuel economy of the drive power source, so as to assure a good balance between the improvement of the vehicle drivability and the reduction of those risks, according to the running state of the vehicle. For example, the risk of the vehicle operator feeling the operating speed of the drive power source kept at the relatively high value for the excessively long length of time is high where the speed of releasing of the accelerator pedal is relatively high, where the amount of reduction of the operation amount of the accelerator pedal is relatively large, or where the operation amount of the accelerator pedal after its releasing operation is relatively small. Accordingly, the amount of reduction of the operating speed of the drive power source in the process of the shifting action to the at least one intermediate overall speed position can be adjusted, and the drivability of the vehicle can be improved by the synchronous shifting actions of the vehicular automatic transmission and the mechanically operated step-variable transmission portion, while at the same time the risk of the vehicle operator feeling the operating speed of the drive power source kept at the relatively high value for the excessively long length of time can be adequately reduced according to the state of releasing of the accelerator pedal, where the intermediate overall speed position selecting portion is configured to select the at least one intermediate overall speed position, as described above with respect to the sixth mode of the invention, such that the selected at least one intermediate overall speed position is closer to the target overall speed position when the speed of releasing of the accelerator pedal is relatively high than when the speed of releasing is relatively low, when the amount of reduction of the operation amount of the accelerator pedal is relatively large than when the amount of reduction is relatively small, or when the operation amount of the accelerator pedal after its releasing operation is relatively small than when the operation amount is relatively large. According to the seventh mode of the invention wherein the intermediate overall speed position selecting portion selects the at least one intermediate overall speed position from the overall speed positions assigned to the present gear position. In the running state of the vehicle in which the shifting shock of the mechanically operated step-variable transmission portion is likely to be generated, the vehicular automatic transmission can be suitably shifted in synchronization with the shifting action of the mechanically operated step-variable transmission portion, so that the operating speed of the drive power source is changed so as to adequately reduce the risk of deterioration of the drivability of the vehicle due to a shifting shock of the step-variable transmission portion. That is, the shifting control apparatus according to the seventh mode of the invention is configured to reduce the risk of deterioration of the vehicle drivability due to the shifting shock, with higher priority, rather than to reduce the risk of the vehicle operator feeling uncomfortable with the operating speed of the drive power source kept at the relatively high value for the excessively long length of time, and the risk of deterioration of the fuel economy of the drive power source. According to the eighth mode of the invention wherein the intermediate overall speed position selecting portion selects the at least one intermediate overall speed position outside the range of the overall speed positions assigned to the present gear position, in the running state of the vehicle in which the vehicle operator is likely to feel that the operating speed of the drive power source is kept at the relatively high value for the excessively long length of time, the operating speed of the drive power source is adequately lowered in the process of the shifting action to the intermediate overall speed position, so that it is possible to adequately reduce the risk of the vehicle operator feeling the operating speed of the drive power source kept at the relatively high value for the excessively long length of time, and the risk of deterioration of the fuel economy of the drive power source. Namely, the shifting control apparatus according to the eighth mode of the invention is configured to reduce the risk of the vehicle operator feeling the operating speed of the drive power source at the relatively high value for the excessively long length of time, with higher priority, rather than to reduce the risk of deterioration of the drivability of the vehicle due to the shifting shock.

According to the tenth mode of the invention, the multiple-step shifting commanding portion is configured to command the vehicular automatic transmission to be shifted up to the at least one intermediate overall speed position, immediately after the moment of determination to shift up the vehicular automatic transmission to the target overall speed position. Accordingly, when the vehicular automatic transmission is commanded to be shifted up as a result of a releasing operation of the accelerator pedal or an operation of a manually operated member, the vehicular automatic transmission is immediately shifted up to the at least one intermediate overall speed position, and the operating speed of the drive power source is rapidly lowered, so that it is possible to adequately reduce the risk of the vehicle operator feeling the operating speed of the drive power source kept at the relatively high value for the excessively long length of time, and the risk of deterioration of the fuel economy of the drive power source.

DETAILED DESCRIPTION OF INVENTION

Figure 1:
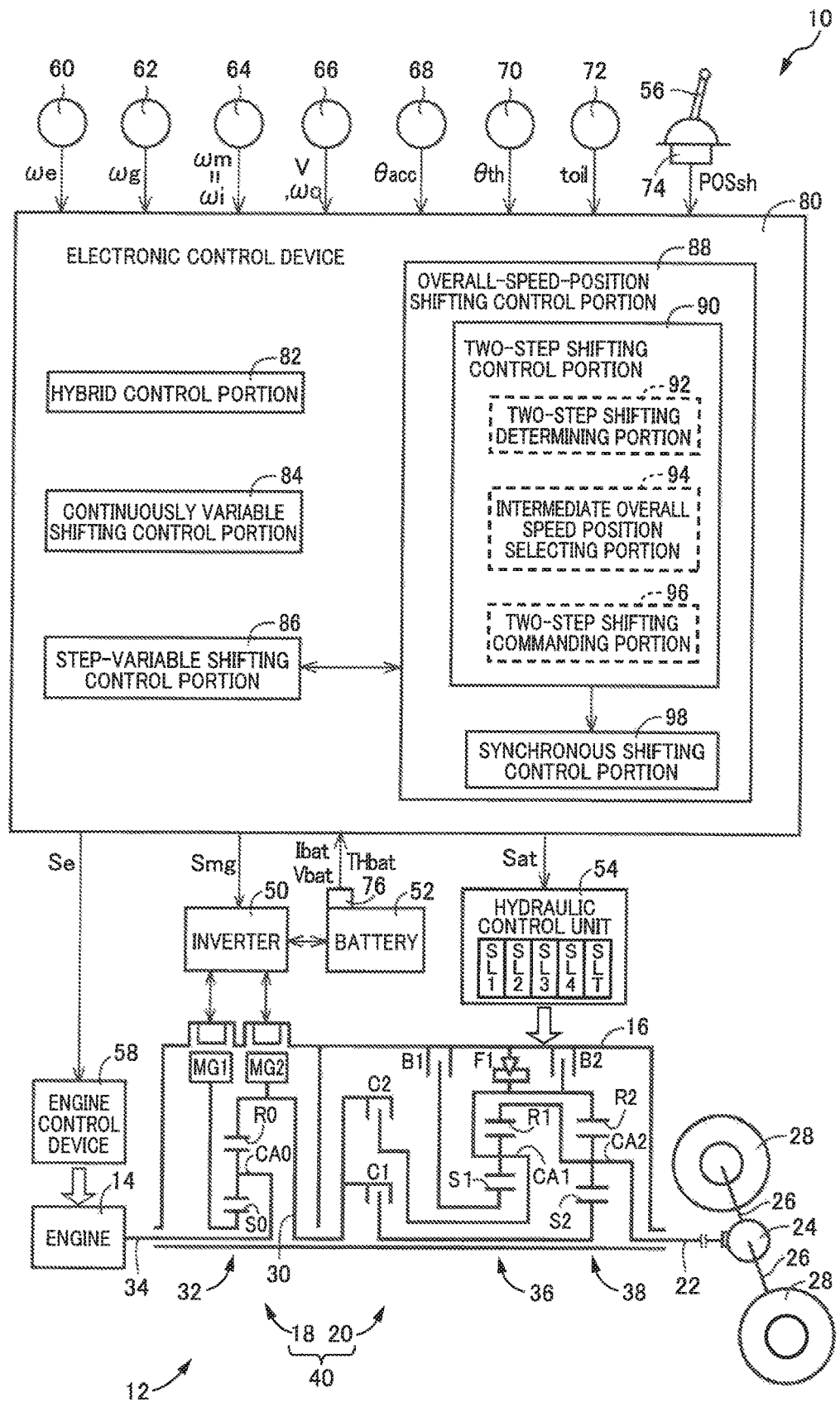
FIG. 1 is a schematic view showing an arrangement of a vehicular drive system including an automatic transmission to be controlled by a shifting control apparatus according to the present invention, and major control functions and control portions of the control apparatus.

As the drive power source of the vehicle, an engine such as an internal combustion engine operable to generate a drive force by combustion of a fuel, and an electric motor are preferably used. The electrically controlled continuously variable transmission portion includes a differential mechanism such as a planetary gear device. However, the electrically controlled continuously variable transmission portion may use a twin-rotor electric motor having an inner rotor and an outer rotor. In this case, the drive power source is connected to one of the inner and outer rotors, while the intermediate power transmitting member is connected to the other of the inner and outer rotors. The twin-rotor electric motor can selectively generate a vehicle driving torque or a regenerative torque, like a motor/generator, and can function as a differential motor/generator. The drive power source and the intermediate power transmitting member are connected to the differential mechanism through clutches and speed changing gears, as needed. To the intermediate power transmitting member is connected a vehicle driving motor/generator either directly, or through the speed changing gears, as needed.

As the differential mechanism of the electrically controlled continuously variable transmission portion, a single planetary gear set of a single-pinion type or a double-pinion type is preferably used. This planetary gear set has three rotary elements consisting of a sun gear, a carrier and a ring gear. In this case, the drive power source is connected to an intermediate one of the rotary elements which is intermediate between the other two rotary elements in a collinear chart wherein rotating speeds of the three rotary elements are represented by a single straight line, and the rotary speed of which is intermediate between those of the other two rotary elements. In the planetary gear set of the single-pinion type, the intermediate rotary element is the carrier. In the planetary gear set of the double-pinion type, the intermediate rotary element is the ring gear. The differential motor/generator and the intermediate power transmitting member are connected to the respective other two rotary elements. However, the intermediate power transmitting member may be connected to the intermediate rotary element. The three rotary elements may be always rotatable at different speeds. Alternatively, selected two of the three rotary elements may be connected to each other through a clutch, so that these two rotary elements are rotated as a unit depending upon a running state of the vehicle. Further, one of the three rotary elements which is connected to the differential motor/generator may be held stationary by a brake, so that a differential rotary motion of that rotary element is limited. The differential mechanism may be provided with a plurality of planetary gear sets.

The motor/generator is a rotary type electrically operated device, more specifically, a motor/generator device capable of selectively functioning as an electric motor, an electric generator, or both of an electric motor and an electric generator. It is possible to use an electric generator as the differential motor/generator, and an electric motor as the vehicle driving motor/generator. However, it is preferable to use the motor/generator as the differential motor/generator and the vehicle driving motor/generator, in view of various different running states of the vehicle.

As the mechanically operated step-variable transmission portion, a planetary gear type transmission and a parallel two-axes type transmission are widely used. For example, the mechanically operated step-variable transmission portion is shifted to a selected one of a plurality of gear positions (AT gear positions) with engaging and releasing actions of selected ones of a plurality of hydraulic operated frictional coupling devices. Generally, the plurality of AT gear positions are forward drive gear positions, but may include at least one reverse drive gear position.

The plurality of overall speed positions described above are established by controlling the operating speed of the drive power source according to the output speed of the vehicular automatic transmission, so as to maintain the speed ratios of the respective overall speed positions. However, it is not required to hold the speed ratios of the overall speed positions constant like those of the AT gear positions of the mechanically operated step-variable transmission portion. Namely, the speed ratios of the overall speed positions may be variable within a predetermined range, or may be limited according to upper and lower limits of rotating speeds of various rotary members of the vehicular automatic transmission. The vehicular automatic transmission is preferably configured to be shifted from one of the plurality of overall speed positions to another, according to predetermined overall speed position shifting conditions. The overall speed position shifting conditions are preferably in the form of an overall speed position shifting map having predetermined shift-up boundary lines and shift-down boundary lines representative of parameters of a running state of the vehicle, for example, representative of a relationship between an output speed of the vehicular automatic transmission and an operation amount of an accelerator pedal. However, the vehicular automatic transmission may be shifted according to any other predetermined automatic shifting conditions, or according to a manual operation of a shift lever or a shift-up/shift-down switch by an operator of the vehicle. While the two-step shifting control portion described above controls only a shift-up action of the vehicular automatic transmission, the overall-speed-position shifting control portion and the synchronous shifting control portion control both of the shift-up and shift-down actions, or only the shift-up action. Namely, the vehicular automatic transmission may be shifted up in steps to a selected one of the overall speed positions, and shifted down continuously to the selected overall speed position. The vehicular automatic transmission need not be always shifted in steps to the selected overall speed position, but may be shifted in steps under a predetermined condition, for example, in a sporty drive mode of the vehicle. The two-step shifting control portion is configured to initially implement at least the shift-up action to the intermediate overall speed position, but may be configured to initially implement the shift-down action to the intermediate overall speed position, as well as to initially implement the shift-up action to the intermediate overall speed position.

The number of the plurality of overall speed positions of the vehicular automatic transmission is preferably equal to or larger than that of the AT gear positions of the mechanically operated step-variable transmission portion. For example, at least one overall speed position is assigned to each of the AT gear positions. The mechanically operated step-variable transmission portion is preferably shifted in synchronization with a shifting action of the vehicular automatic transmission to a target overall speed position. In this case, the mechanically operated step-variable transmission portion is shifted with a change of the operating speed of the drive power source, so that the vehicle operator is unlikely to feel uncomfortable, even if a shifting shock is generated in the process of the shifting action of the mechanically operated step-variable transmission portion. The number of the overall speed positions is preferably two or more times (e.g., about two or three times) that of the AT gear positions. The mechanically operated step-variable transmission portion is shifted such that the rotating speed of the intermediate power transmitting member, an operating speed of the vehicle driving motor/generator connected to the intermediate power transmitting member, or a rotating speed of the differential mechanism of the electrically controlled continuously variable transmission portion is held within a predetermined range, and the vehicular automatic transmission is shifted such that the operating speed of the drive power source is held within a predetermined range. The numbers of the AT gear positions and the overall speed positions are suitably determined. In an ordinary type of vehicle, it is preferably that the mechanically operated step-variable transmission portion has one of second through sixth speed AT gear positions, while the vehicular automatic transmission has one of fifth through twelfth overall speed positions.

The determinations to implement the synchronous shifting actions such that the shifting controls to establish the target overall speed position and the target AT gear position overlap each other may be made simultaneously according to a common shifting condition (shifting map). Alternatively; the determination to establish the target overall speed position may be made in the process of the shifting control to establish the target AT gear position. Further, the determinations to establish the target overall speed position and AT gear position may be made with a predetermined time interval between the moments of the determinations. The synchronous shifting control to assure that the two shifting actions to establish the target overall speed position and AT gear position take place in synchronization with each other is implemented by delaying the moment of generation of the command to establish the target overall speed position so that the inertia phases of the two shifting actions (during which the rotating speeds of input rotary members of the vehicular automatic transmission and the mechanically operated step-variable transmission portion change according to changes of their speed ratio) at least partially overlap each other. A length of delay of the moment of generation of the command to establish the target overall speed position, that is, a point of time at which the command is generated can be determined by experimentation or simulation on the basis of a difference between control response times of the two shifting actions after the moment of generation of the command to establish the target AT gear position, for instance. However, the moment of generation of the command to establish the target overall speed position may be determined by detecting the moment of initiation of the inertia phase of the shifting action to the target AT gear position, on the basis of a change of the rotating speed of the intermediate power transmitting member during the shifting action, or by detecting a degree of progress of the shifting action to the target AT gear position, on the basis of a hydraulic pressure applied to the frictional coupling device to establish the target AT gear position, namely, an engaging torque of the frictional coupling device.

As described above, the multiple-step shifting control portion includes (a) the multiple-step shifting determining portion configured to determine, according to the predetermined condition for implementing the multiple-step shifting control, whether the vehicular automatic transmission should be shifted to the intermediate overall speed position, (b) the intermediate overall speed position selecting portion configured to select the intermediate overall speed position, according to the running state of the vehicle, such as an operation amount of an accelerator pedal, and (c) the multiple-step shifting commanding portion configured to command the vehicular automatic transmission to be shifted to the intermediate overall speed position, at the predetermined timing after the moment of determination to shift the vehicular automatic transmission to the target overall speed position. The determination as to whether the condition for implementing the multiple-step shifting control to shift the vehicular automatic transmission eventually to the target overall speed. position through the intermediate overall speed position is made depending upon whether the vehicle operator is likely to feel that an operating speed of the drive power source is kept at a relatively high value for an excessively long length of time, for example. Described more specifically, the vehicle operator is likely to feel the operating speed of the drive power source being kept at the relatively high value for the excessively long length of time, where the speed of releasing of the accelerator pedal is higher than a predetermined upper limit, where the amount of reduction of the operation amount of the accelerator pedal is larger than a predetermined upper limit, where the operation amount after the releasing operation of the accelerator pedal is smaller than a predetermined lower limit, or where the shifting action of the mechanically operated step-variable transmission portion has a relatively long control response time (where a temperature of a working fluid used for the step-variable transmission portion is lower than a predetermined lower limit, for instance). A shift-up action of the mechanically operated step-variable transmission portion to the target AT gear position just after the accelerator pedal has been switched from its ON state to its OFF state is not generally required to have a high degree of control response, so that this shift-up action is controlled to take place for a relatively long length of time, for reducing a shifting shock of the mechanically operated step-variable transmission portion. Where this shift-up action is performed, the vehicle operator is likely to feel that the operating speed of the drive power source is kept at the relatively high value for the excessively long length of time. The intermediate overall speed position selecting portion is configured to select an optimum one of the overall speed positions as the intermediate overall speed position, according to the speed of releasing of the accelerator pedal, the amount of reduction of its operation amount and the operation amount after its releasing operation. However, a range of the intermediate overall speed positions from which the intermediate overall speed position can be selected may be limited to reduce a risk of generation of a shifting shock of the mechanically operated step-variable transmission portion, where the risk of generation of the shifting shock is considered to be high due to a low degree of controllability of the shifting action of the mechanically operated step-variable transmission portion, for example, where the working fluid temperature is not higher than the predetermined lower limit, where a maximum charging or discharging amount of a battery is limited, or where an output of the differential motor/generator is limited. This restriction of selection of the intermediate overall speed position is made according to the present AT gear position. However, the overall speed position which is relatively close to the target overall speed position i.e., higher speed side overall speed position, is desirably selected as the intermediate overall speed position, where the vehicle operator is likely to feel that the operating speed of the drive power source is kept at the relatively high value for the excessively long length of time, for example, where an operating sound of the drive power source is easily audible at a low running speed of the vehicle, where the operating speed of the drive power source is relatively high, or where the operating speed of the drive power source is kept at the relatively high value for a relatively long length of time (where the shifting action of the mechanically operated step-variable transmission portion has a relatively long control response time). The multiple-step shifting commanding portion is preferably configured to command the vehicular automatic transmission to be shifted to the selected intermediate overall speed position, at a timing immediately after the moment of determination to implement the shifting action to the target overall speed position. However, the timing at which the vehicular automatic transmission is commanded to be shifted to the intermediate overall speed position may be suitably determined, as long as the timing is prior to the moment at which the vehicular automatic transmission is commanded to be shifted to the target overall speed position, which moment is a certain length of time after the above-indicated moment of determination to implement the shifting action.

The multiple-step shifting control portion may be configured to implement the shifting action to the target overall speed position through the selected intermediate overall speed position, only where the predetermined condition is satisfied, as described above. However, the multiple-step shifting control portion may be configured to always implement the shift-up action to the target overall speed position through the intermediate overall speed position, where the shift-up action to the target overall speed position is performed together with the shift-up action to the target AT gear position, and where the target overall speed position is other than the speed position next to the present speed position. The intermediate overall speed position is selected according to the running state of the vehicle, such as the operation amount of the accelerator pedal. However, a predetermined one of the overall speed positions may be selected as the intermediate overall speed position. For example, the overall speed position next lower than the target overall speed position, the overall speed position next higher than the present overall speed position, or the overall speed position intermediate in a range of the overall speed positions each available as a candidate of the intermediate overall speed position may be selected as the intermediate overall speed position. The multiple-step shifting control portion may be a two-step shifting control portion configured to command the vehicular automatic transmission to be shifted to the target overall speed position in two steps through only one intermediate overall speed position. However, the multiple-step shifting control portion may be configured to command the vehicular automatic transmission to be shifted up to the target overall speed position in three or more steps through two or more intermediate overall speed positions.

Embodiment

Referring to the drawings, a preferred embodiment of the present invention will be described in detail. Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1, the vehicular drive system 12 is provided with an engine 14, an electrically controlled continuously variable transmission portion 18 connected directly or indirectly via a damper (not shown) or any other device to the engine 14, and a mechanically operated step-variable transmission portion 20 connected to an output rotary member of the continuously variable transmission portion 18. The continuously variable transmission portion 18 and the step-variable transmission portion 20 are disposed in series with each other within a transmission casing 16 (hereinafter referred to as "casing 16") functioning as a non-rotatable member fixed to a vehicle body, such that the transmission portions 18 and 20 are disposed coaxially with each other on a common axis. The vehicular drive system 12 is further provided with an output shaft 22 which is an output rotary member of the mechanically operated step-variable transmission portion 20, a differential gear device 24 connected to the output shaft 22, a pair of axles 26 connected to the differential gear device 24, and drive wheels 28. In the vehicular drive system 12, a drive force ("drive torque" or "drive power" unless otherwise distinguished from the drive force) of the engine 14 and a second motor/generator MG2 (described below) is transmitted to the mechanically operated step-variable transmission portion 20, and is transmitted from the step-variable transmission portion 20 to the drive wheels 28 through the differential gear device 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the electrically controlled continuously variable transmission portion 18 and the mechanically operated step-variable transmission portion 20 are constructed substantially symmetrically with each other about the axis of the engine 14 (about the above-indicated common axis), and that FIG. 1 does not show the lower halves of the transmission portions 18 and 20.

The engine 14 is a drive power source to drive the vehicle 10, which is a known internal combustion engine such as a gasoline engine or a diesel engine. An engine torque Te, which is an output torque of this engine 14, is controlled by an electronic control device 80 (described below) which controls the operating condition of the engine 14 as represented by an opening angle of a throttle valve or an intake air quantity, an amount of injection of a fuel and an ignition timing. In the present embodiment, the engine 14 is connected to the electrically controlled continuously variable transmission portion 18, without a fluid-operated type power transmitting device such as a torque converter or a fluid coupling being disposed between the engine 14 and the continuously variable transmission portion 18.

The electrically controlled continuously variable transmission portion 18 is provided with: a first motor/generator MG1; a differential mechanism 32 functioning as a power distributing device to mechanically distribute the drive force of the engine 14 to the first motor/generator MG1, and to an intermediate power transmitting member 30 which is an output rotary member of the continuously variable transmission portion 18; and the above-indicated second motor/generator MG2 operatively connected to the intermediate power transmitting member 30 in a power transmittable manner. The continuously variable transmission portion 18 is an electrically controlled differential portion wherein a differential state of the differential mechanism 32 is controllable by controlling an operating state of the first motor/generator MG1 as well as an electrically controlled continuously variable transmission. The first motor/generator MG1 functions as a differential motor/generator while the second motor/generator MG2 is an electric motor which functions as a vehicle driving power source. The vehicle 10 is a hybrid vehicle provided with the drive power source in the form of the engine 14 and the second motor/generator MG2.

Each of the first motor/generator MG1 and the second motor/generator MG2 is an electrically operated rotary device having a function of an electric motor and a function of an electric generator. The first motor/generator MG1 and the second motor/generator MG2 are connected to a battery 52 through an inverter 50 provided on the vehicle 10. The inverter 50 is controlled by the control apparatus in the form of the above-indicated electronic control device 80, to control an output torque (regenerative torque) of the first motor/generator MG1, namely, an MG1 torque Tg, and an output torque (forward driving torque) of the second motor/generator MG2, namely, an MG2 torque Tm. The battery 52 also provided on the vehicle 10 is an electric power storage device to and from which an electric power is supplied from and to the first motor/generator MG1 and the second motor/generator MG2.

The differential mechanism 32 is a planetary gear set of a single-pinion type having three rotary elements in the form of a sun gear S0, a carrier CA0 and a ring gear R0 and performing differential action. The carrier CA0 is operatively connected to the engine 14 through a connecting shaft 34 in a power transmittable manner, and the sun gear S0 is operatively connected to the first motor/generator MG1 in a power transmittable manner, while the ring gear R0 is operatively connected to the second motor/generator MG2 in a power transmittable manner. In the differential mechanism 32, the carrier CA0 functions as an input rotary element, and the sun gear S0 functions as a reaction rotary element, while the ring gear R0 functions as an output rotary element.

The mechanically operated step-variable transmission portion 20 is a step-variable transmission which constitutes a part of a power transmitting path between the intermediate power transmitting member 30 and the drive wheels 28. The intermediate power transmitting member 30 also functions as an input rotary member (AT input rotary member) of the mechanically operated step-variable transmission portion 20. The mechanically operated step-variable transmission portion 20 is considered to be a step-variable transmission constituting a part of a power transmitting path between the second motor/generator MG2 and the drive wheels 28, since the second motor/generator MG2 is connected to the intermediate power transmitting member 30 such that the intermediate power transmitting member 30 is rotated together with the second motor/generator MG2. The mechanically operated step-variable transmission portion 20 is a known automatic transmission of a planetary gear type which is provided with a plurality of planetary gear sets in the form of a first planetary gear set 36 and a second planetary gear set 38, and a plurality of coupling devices in the form of a clutch C1, a clutch C2, a brake B1 and a brake B2 (hereinafter referred to as "coupling devices CB" unless otherwise specified).

Each of the coupling devices CB is a hydraulically operated frictional coupling device in the form of a multiple-disc type or a single-disc type clutch or brake that is operatively pressed by a hydraulic actuator, or a band brake that is operatively tightened by a hydraulic actuator. The coupling devices CB are selectively placed in engaged, slipping or released states with their torque capacities (engaging torque values) Tcb being changed according to engaging hydraulic pressures Pcb applied thereto, which are regulated by respective linear solenoid-operated valves SL1-SL4 (shown in FIG. 4) incorporated within a hydraulic control unit 54.

In the mechanically operated step-variable transmission portion 20, selected ones of rotary elements (sun gears S1 and S2, carriers CA1 and CA2, and ring gears R1 and R2) of the first and second planetary gear sets 36 and 38 are connected to each other or to the intermediate power transmitting member 30, casing 16 or output shaft 22, either directly or indirectly (selectively) through the coupling devices CB or a one-way clutch F1.

The mechanically operated step-variable transmission portion 20 is shifted to a selected one of four AT gear positions by engaging actions of selected ones of the coupling devices CB. These four AT gear positions have respective different speed ratios γat (=AT input speed ωi/AT output speed ωo). The AT input speed ωi is a rotating speed (angular velocity) of the input rotary member of the mechanically operated step-variable transmission portion 20, that is, a rotating speed of the intermediate power transmitting member 30, which is equal to MG2 speed ωm which is an operating speed of the second motor/generator MG2. Thus, the AT input speed ωi can be represented by the MG2 speed ωm. The AT output speed ωo is a rotating speed of the output shaft 22 of the mechanically operated step-variable transmission portion 20, which is considered to be an output speed of a vehicular automatic transmission 40 which consists of the electrically controlled continuously variable transmission portion 18 and the mechanically operated step-variable transmission portion 20.

Figures 2, 3:
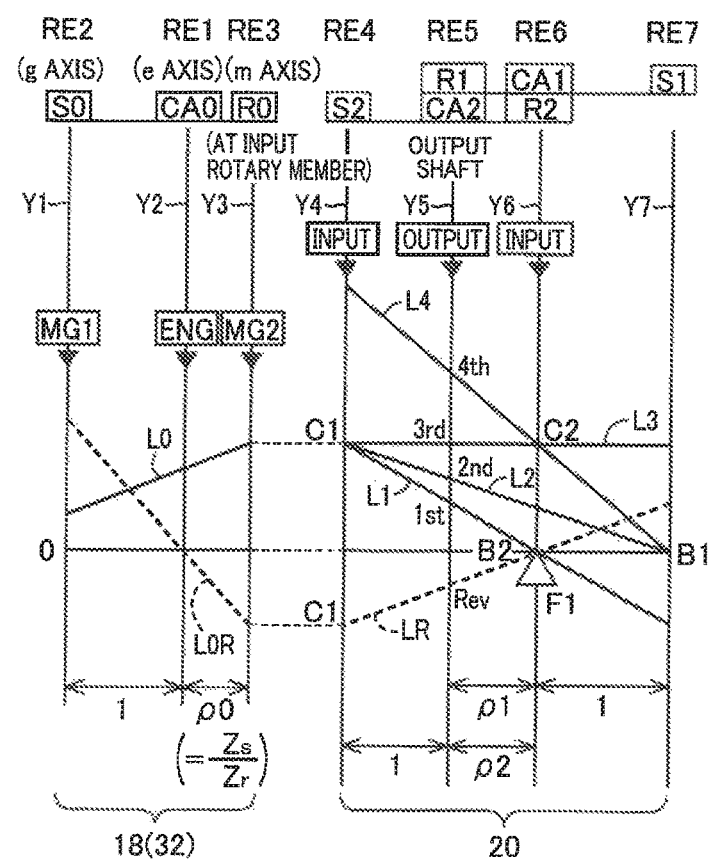
FIG. 2 is a table indicating a relationship between AT gear positions of a mechanically operated step-variable transmission portion shown in FIG. 1 and combinations of coupling devices placed in engaged states to establish the respective AT gear positions.
FIG. 3 is a collinear chart indicating a relationship among rotating speeds of rotary elements of an electrically controlled continuously variable transmission portion and the mechanically operated step-variable transmission portion.

As shown in the table of FIG. 2, the mechanically operated step-variable transmission portion 20 has the four forward drive AT gear positions consisting of the first (1$^{st}$) through fourth (4$^{th}$) speed AT gear positions. The first speed AT gear position has a highest speed ratio γat, while the fourth speed AT gear position a lowest speed ratio γat. The speed ratios γat of the first through fourth speed AT gear positions decrease in the direction from the first speed AT gear position (lowest-speed gear position) toward the fourth speed AT gear position (highest-speed gear position). The table of FIG. 2 indicates the relationship between the first through fourth speed AT gear positions and combinations of the coupling devices CB placed in the engaged states to establish the respective AT gear positions. In the table, "O" indicates the engaged state of the coupling devices CB, "Δ" indicates the engaged state of the coupling device B2 during application of an engine brake to the vehicle 10 or during a shifting action of the mechanically operated step-variable transmission portion 20 while the vehicle 10 is in a coasting run, while the blank indicates the released state of the coupling devices CB. The one-way clutch F1 indicated above is disposed in parallel to the brake B2 which is placed in the engaged state to establish the first speed AT gear position "$1^{st}$", so that the brake B2 is not required to be placed in the engaged state upon starting or acceleration of the vehicle 10. It is noted that the mechanically operated step-variable transmission portion 20 is placed in a neutral position (a power transmission cutoff state).

The step-variable transmission portion 20 is shifted up or down to establish a newly selected one of the four AT gear positions, according to an operation amount θacc of an accelerator pedal by a driver (operator) of the vehicle 10 and a vehicle running speed V, with a releasing action of one of the coupling devices CB and a concurrent engaging action of another coupling device CB, which concurrent releasing and engaging actions are controlled by the above-indicated electronic control device 80. Thus, the mechanically operated step-variable transmission portion 20 is shifted up or down from one of the AT gear positions to another by a. so-called "clutch-to-clutch" shifting operation, namely, concurrent releasing and engaging actions of the selected two coupling devices CB (releasing-side and engaging-side coupling devices CB). For instance, the step-variable transmission portion 20 is shifted down from the third speed AT gear position "$3^{rd}$" to the second speed AT gear position "$2^{nd}$", with the releasing action of the clutch C2 (releasing-side coupling device CB) and the concurrent engaging action of the brake B1 (engaging-side coupling device CB), while the clutch C1 remains in the engaged state, as indicated in the table of FIG. 2. In this instance, releasing hydraulic pressure applied to the clutch C2 (releasing-side coupling device CB) and engaging hydraulic pressure applied to the brake B1 (engaging-side coupling device CB) are transiently controlled according to predetermined patterns of change, to bring these clutch C2 and brake B1 into the released and engaged states, respectively.

Figure 4:
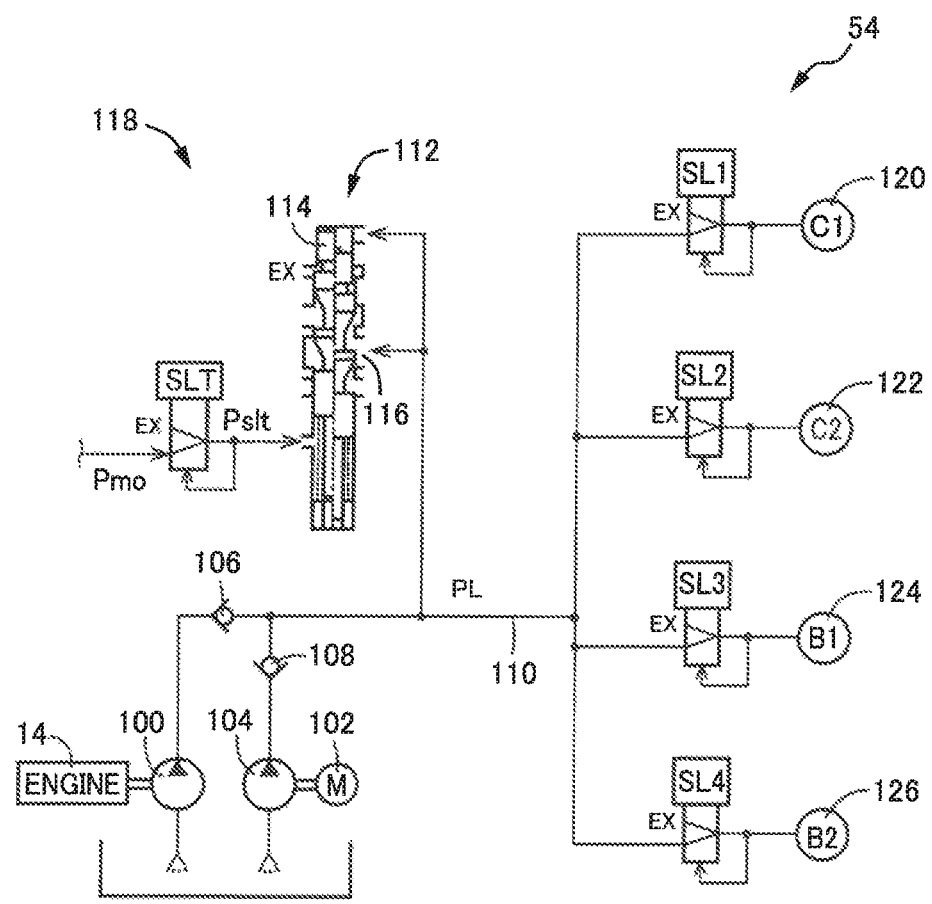
FIG. 4 is a circuit diagram of a hydraulic control unit incorporating clutches C1 and C2 and brakes B1 and B2 of the mechanically operated step-variable transmission portion.

FIG. 4 is the circuit diagram of the hydraulic control unit 54 incorporating the linear solenoid-operated valves SL1-SL4 for controlling the engaging and releasing actions of the coupling devices CR The hydraulic control unit 54 includes a mechanically operated oil pump 100 operated by the engine 14, and an electrically operated oil pump 104 operated by a pump driving electric motor 102, which are provided as a hydraulic pressure source for the coupling devices CR The electrically operated oil pump 104 is operated while the engine 14 is at rest. A pressurized working fluid delivered from those oil pumps 100 and 104 is fed to a line pressure passage 110 through respective check valves 106 and 108, and a pressure of the working fluid in the line pressure passage 110 is regulated to a predetermined line pressure PL by a line pressure control valve 112, which is a primary regulator valve, for example. A linear solenoid-operated valve SLT, which is connected to the line pressure control valve 112, is electrically controlled by the electronic control device 80, to convert a substantially constant modulator pressure Pmo into a pilot pressure Pslt. This pilot pressure Pslt is applied to the line pressure control valve 112, so that a spool 114 of the line pressure control valve 112 is biased by the pilot pressure Pslt, and is axially moved, whereby a cross-sectional surface area of opening of a port communicating with a drain passage 116 is changed, so that the line pressure PL is regulated according to the pilot pressure Pslt. This line pressure PL is regulated according to a required vehicle drive force or torque as represented by the accelerator pedal operation amount θacc. The linear solenoid-operated valve SLT indicated above is an electromagnetic pressure regulating valve to be used for regulating the line pressure, and the line pressure control valve 112 is a hydraulic pressure control valve to regulate the line pressure PL according to the pilot pressure Pslt received from the linear solenoid-operated valve SLT. A line pressure regulating device 118 is constituted primarily by the line pressure control valve 112 and the linear solenoid-operated valve SLT.

The pressurized working fluid having the line pressure PL regulated by the line pressure regulating device 118 is supplied to the linear solenoid-operated valves SL1-SL4, etc. through the line pressure passage 110. The linear solenoid-operated valves SL1-SL4 are held in communication with respective hydraulic actuators (hydraulic cylinders) 120, 122, 124 and 126 of the respective clutches and brakes C1, C2, B1 and B2, and output pressures (engaging hydraulic pressures Pcb) of the linear solenoid-operated valves SL1-SL4 are controlled according to hydraulic control command signals Sat generated from the electronic control device 80, so that the clutches and brakes C1, C2, B1 and B2 are individually placed in their engaged or released state, to selectively establish one of the first through fourth speed AT gear positions of the mechanically operated step-variable transmission portion 20. The linear solenoid-operated valves SL1-SL4 are solenoid-operated valves provided to selectively place the clutches and brakes C1, C2, B1 and B2 in their engaged states according to the hydraulic control command signals Sat received from the electronic control device 80.

The collinear chart of FIG. 3 indicates a relationship among rotating speeds of the rotary elements of the electrically controlled continuously variable transmission portion 18 and the mechanically operated step-variable transmission portion 20. In this collinear chart, three vertical lines Y1, Y2 and Y3 corresponding to the respective three rotary elements of the differential mechanism 32 of the continuously variable transmission portion 18 respectively represent a "g" axis representing the rotating speed (MG1 speed ωg) of the second rotary element RE2 in the form of the sun gear S0, an "e" axis representing the rotating speed. (engine speed ωe) of the first rotary element RE1 in the form of the carrier CA0, and an "m" axis representing the rotating speed (MG2 speed ωm, and AT input speed ωi) of the third rotary element RE3 in the form of the ring gear R0. Further, four vertical lines Y4, Y5, Y6 and Y7 corresponding to the respective four rotary elements of the step-variable transmission portion 20 respectively represent an axis representing the rotating speed of the fourth rotary element RE4 in the form of the sun gear S2, an axis representing the rotating speed (output speed ωo) of the fifth rotary element RE5 in the form of the ring gear R1 and the carrier CA2 fixed to each other, namely, the rotating speed of the output shaft 22, an axis representing the rotating speed of the sixth rotary element. RE6 in the form of the carrier CA1 and the ring gear R2 fixed to each other, and an axis representing the rotating speed of the seventh rotary element RE7 in the form of the sun gear S1. The distances between the adjacent ones of the vertical lines Y1, Y2 and Y3 are determined by a gear ratio ρ0 of the differential mechanism 32, while the distances between the adjacent ones of the vertical lines Y4-Y7 are determined by gear ratios ρ1 and ρ2 of the respective first and second planetary gear sets 36 and 38.

Referring to the collinear chart of FIG. 3, the differential mechanism 32 of the electrically controlled continuously variable transmission portion 18 is arranged such that the engine 14 (represented as "ENG" in the collinear chart) is connected to the first rotary element RE1, and the first motor/generator MG1 (represented as "MG1" in the collinear chart) is connected to the second rotary element RE2, while the second motor/generator MG2 (represented as "MG2" in the collinear chart) is connected to the third rotary element RE3 which is rotated together with the intermediate power transmitting member 30. Thus, a rotary motion of the engine 14 is transmitted to the step-variable transmission portion 20 through the intermediate power transmitting member 30. In a part of the collinear chart corresponding to the electrically controlled continuously variable transmission portion 18, straight lines L0 and L0R intersecting the vertical line Y2 represent relationships among the rotating speeds of the sun gear S0, carrier CA0 and ring gear R0.

The mechanically operated step-variable transmission portion 20 is arranged such that the fourth rotary element RE4 is selectively connected to the intermediate power transmitting member 30 through the clutch C1, the fifth rotary element RE5 is connected to the output shaft 22, the sixth rotary element RE6 is selectively connected to the intermediate power transmitting member 30 through the clutch C2 and is selectively connected to the casing 16 through the brake B2, and the seventh rotary element RE7 is selectively connected to the casing 16 through the brake B1. In a part of the collinear chart corresponding to the mechanically operated step-variable transmission portion 20, straight lines L1, L2, L3, L4 and LR intersecting the vertical line Y5 represent relationships among the rotating speeds of the rotary elements RE4-RE7 in the respective first, second, third, and fourth speed AT gear positions "$1^{st}$", "$2^{nd}$", "$3^{rd}$" and "$4^{th}$" and a reverse drive AT gear position "Rev", that are selectively established by controlling the engaging and releasing actions of the coupling devices CB. The reverse drive AT gear position "Rev" is established in the engaged states of the clutch C1 and the brake B2, like the first speed AT gear position "$1^{st}$", while the input rotary element in the form of the fourth rotary element RE4 is rotated in the reverse direction.

Solid straight lines L0, L1, L2, L3 and L4 in the collinear chart of FIG. 3 indicate the relative rotating speeds of the rotary elements in a hybrid drive mode in which the vehicle 10 is driven in the forward direction with at least the engine 14 being operated as a drive power source. In the differential mechanism 32 during this hybrid drive mode, when a torque Te of the engine 14 (engine torque Te) is applied to the carrier CA0 while a reaction torque Tg which is a negative torque (regenerative torque) generated by the first motor/generator MG1 operated in the positive direction is applied to the sun gear S0, a directly transmitted engine torque Td ($=Te/(1+\rho 0)=-(1/\rho 0)*Tg$) which is a positive torque is applied to the ring gear R0 and rotating the ring gear R0 in the positive direction. The vehicle 10 is driven in the forward direction with a vehicle drive torque which is a sum of the directly transmitted engine torque Td and the MG2 torque Tm and which is transmitted to the drive wheels 28 through the mechanically operated step-variable transmission portion 20 selectively placed in one of the first through fourth speed AT gear positions according to required vehicle drive force as represented by the accelerator pedal operation amount θacc. At this time, the first motor/generator MG1 functions as an electric generator operated. In the positive direction and generating a negative torque. An electric power Wg generated by the first motor/generator MG1 is stored in the battery 52 or consumed by the second motor/generator MG2. The second motor/generator MG2 is operated to generate the MG2 torque Tm, with all or a part of the electric power Wg generated by the first motor/generator MG1, or a sum of the generated electric power Wg and the electric power supplied from the battery 52.

In the differential mechanism 32 during a motor drive mode in which the vehicle 10 is driven with a drive force generated by the second motor/generator MG2 operated as a drive power source while the engine 14 is held at rest, the carrier CA0 is held stationary while the MG2 torque Tm which is a positive torque is applied to the ring gear R0 and rotating the ring gear R0 in the positive direction. The state of the differential mechanism in this motor drive mode is not shown in the collinear chart of FIG. 3. At this time, the first motor/generator MG1 connected to the sun gear S0 is placed in a non-load state and freely operated in the negative direction. Namely, in the motor drive mode, the engine 14 is held in a non-operated state, so that an operating speed ωe of the engine 14 (engine speed ωe) is kept zero, and the vehicle 10 is driven in the forward direction with the MG2 torque Tm (positive forward driving torque), which is transmitted as a forward drive torque to the drive wheels 28 through the mechanically operated step-variable transmission portion 20 placed in one of the first speed AT gear position "$1^{st}$" through the fourth speed AT gear position "$4^{th}$".

Broken straight lines L0R and LR in the collinear chart of FIG. 3 indicate the relative rotating speeds of the rotary elements in a motor drive mode in which the vehicle 10 is driven in the rearward direction. During driving of the vehicle 10 in the rearward direction in this motor drive mode, the MG2 torque Tm which is a negative torque generated by the second motor/generator MG2 operated in the negative direction is applied to the ring gear R0, and is transmitted to the drive wheels 28 as a drive torque to drive the vehicle 10 in the rearward direction, through the mechanically operated step-variable transmission portion 20 placed in the first speed AT gear position. The electronic control device 80 controls the second motor/generator MG2 to permit the vehicle 10 to be driven in the rearward direction with the reverse driving MG2 torque Tm (MG2 torque TmR; negative vehicle driving torque) acting in the direction opposite to the direction of acting of the forward driving MG2 torque Tm (MG2 torque TmF; positive vehicle driving torque), while the mechanically operated step-variable transmission portion 20 is placed in the forward-drive low-speed gear position (e.g., first speed AT gear position) of the plurality of the AT gear positions (first through fourth speed AT gear positions). Thus, the vehicle 10 is driven in the rearward direction with the reverse (negative) MG2 torque Tm while the mechanically operated step-variable transmission portion 20 is placed in one of the forward drive AT gear positions. The mechanically operated step-variable transmission portion 20 does not have an exclusive reverse drive AT gear position in which the direction of the output rotary motion is reversed with respect to that of the input rotary motion. In the hybrid drive mode, too, the second motor/generator MG2 can be operated in the negative direction as indicated by the straight line L0R, while the engine 14 is held operated in the positive direction, so that the vehicle 10 can be driven in the rearward direction in the hybrid drive mode, as well as in the motor drive mode.

In the vehicular drive system 12, the continuously variable transmission portion 18 functions as an electrically controlled shifting mechanism (electrically controlled differential mechanism) provided with the differential mechanism 32 the differential state of which is controlled by controlling the operating state of the first motor/generator MG1, and which has the three rotary elements, that is, the first rotary element RE1 in the form of the carrier CA0 to which the engine 14 is operatively connected in a power transmittable manner, the second rotary element RE2 in the form of the sun gear S0 to which the first motor/generator MG1 is operatively connected in a power transmittable manner, and the third rotary element RE3 in the form of the ring gear R0 to which the second motor/generator MG2 is operatively connected in a power transmittable manner. Namely, the electrically controlled continuously variable transmission portion 18 has the differential mechanism 32 to which the engine 14 is operatively connected in a power transmittable manner, and the first motor/generator MG1 to which the differential mechanism 32 is operatively connected in a power transmittable manner, and the operating state of which is controlled to control the differential state of the differential mechanism 32. The electrically controlled continuously variable transmission portion 18 is operated as an electrically controlled continuously variable transmission a speed ratio $\gamma 0$ (=$\omega e/\omega m$) of which is continuously variable. The speed ratio $\gamma 0$ is a ratio of a rotating speed of the connecting shaft 34 (namely, engine speed $\omega e$) to the rotating speed of the intermediate power transmitting member 30 (namely, MG2 speed $\omega m$).

In the hybrid drive mode, for instance, the rotating speed of the sun gear S0 is raised or lowered by controlling an operating speed of the first motor/generator MG1 while the rotating speed of the ring gear R0 is determined by the rotating speed of the drive wheels 28 with the mechanically operated step-variable transmission portion 20 placed in a selected one of the AT gear positions, so that the rotating speed of the carrier CA0 (namely, engine speed $\omega e$) is accordingly raised or lowered. During running of the vehicle 10 with an operation of the engine 14 as the drive power source, therefore, the engine 14 can be operated at an efficient operating point. That is, the mechanically operated step-variable transmission portion 20 to be placed in a selected one of the AT gear positions and the electrically controlled continuously variable transmission portion 18 functioning as a continuously variable transmission cooperate to provide the vehicular automatic transmission 40 which functions as a continuously variable transmission as a whole.

Alternatively, the electrically controlled continuously variable transmission portion 18 can be shifted like a step-variable transmission. Accordingly, the vehicular automatic transmission 40 constituted by the mechanically operated step-variable transmission portion 20 to be placed in one of the AT gear positions and the electrically controlled continuously variable transmission portion 18 which can be shifted like the step-variable transmission can be shifted like a step-variable transmission as a whole. That is, in the vehicular automatic transmission 40, the mechanically operated step-variable transmission portion 20 and the electrically controlled continuously variable transmission portion 18 can be controlled to selectively establish a plurality of speed positions (hereinafter referred to as "overall speed positions" although it may be also referred to as "conceptual speed positions") having respective different values of a speed ratio $\gamma t$ (=$\omega e/\omega o$) which is a ratio of the engine speed $\omega e$ to the output speed $\omega o$. The speed ratio $\gamma t$ is an overall speed ratio of the vehicular automatic transmission 40 consisting of the electrically controlled continuously variable transmission portion 18 and the mechanically operated step-variable transmission portion 20 which are disposed in series with each other. The overall speed ratio $\gamma t$ is equal to a product of the speed ratio $\gamma 0$ of the continuously variable transmission portion 18 and the speed ratio $\gamma at$ of the step-variable transmission portion 20, namely, $\gamma t=\gamma 0*\gamma at$.

Figure 5:
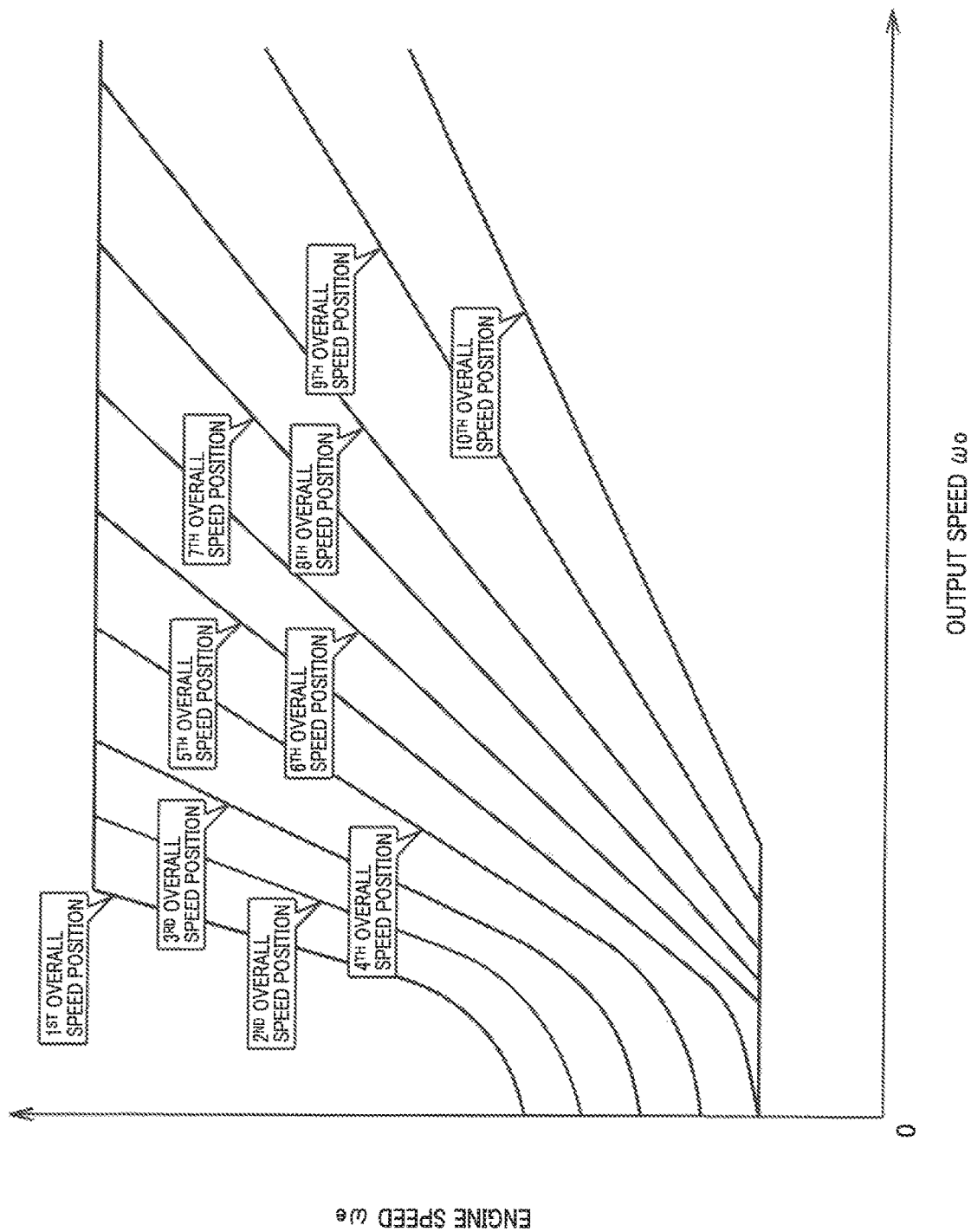
FIG. 5 is a view illustrating an example of a relationship between an output speed of an automatic transmission and an engine speed, for each of a plurality of overall speed positions.

The plurality of overall speed positions can be established by controlling the first motor/generator MG1 so as to change the engine speed $\omega e$ according to the output speed $\omega o$ so as to maintain the respective values of the speed ratio $\gamma t$ of the respective overall speed positions, as indicated in FIG. 5 by way of example. The speed ratio $\gamma t$ of each of the overall speed positions need not be constant over the entire range of the running state of the vehicle 10 represented by the engine speed $\omega e$ and the output speed $\omega o$. That is, the relationship between the engine speed $\omega e$ and the output speed $\omega o$ for each of the overall speed positions need not be represented by a straight line passing a zero point 0 in the coordinate system of FIG. 5, and the speed ratio values $\gamma t$ of the overall speed positions may be set to vary in predetermined areas of the entire range of the running state, or limited by upper and lower limits of the rotating speeds of the rotary elements of the vehicular automatic transmission 40, FIG. 5 illustrates an example of the relationship between the engine speed $\omega e$ and the output speed $\omega o$ for the first through tenth overall speed positions. As is apparent from FIG. 5, the overall speed positions can be established by controlling the engine speed we according to the output speed $\omega o$, irrespective of the presently established AT gear position of the mechanically operated step-variable transmission portion 20.

Figures 6, 7:
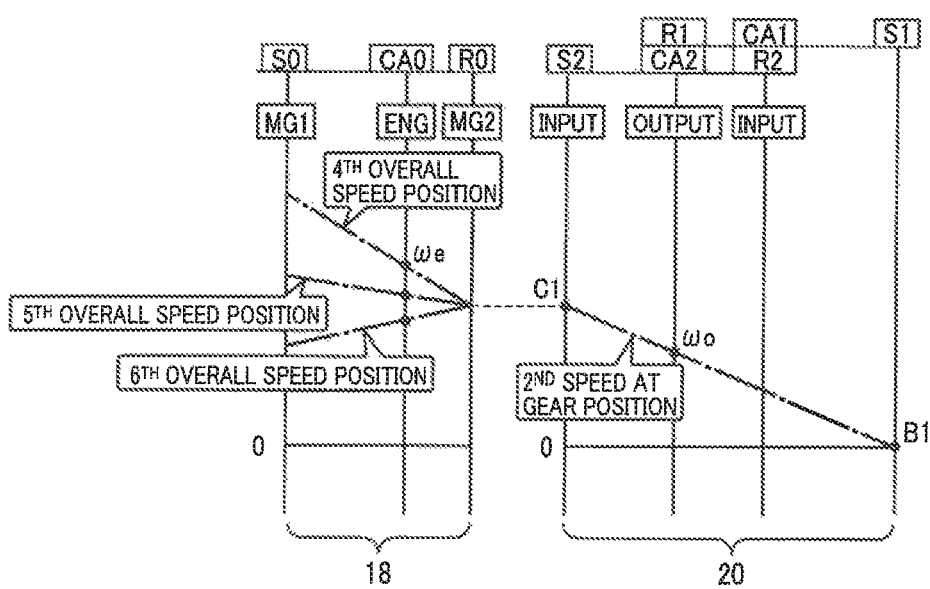
FIG. 6 is a table indicating an example of a relationship between the plurality of overall speed positions of the automatic transmission and the AT gear positions of the step-variable transmission portion.
FIG. 7 is a collinear chart indicating fourth to sixth overall speed positions established in the second AT gear position.

At least one overall speed position is provided for each of the four AT gear positions of the mechanically operated step-variable transmission portion 20, with a combination of each AT gear position with at least one of the different speed ratio values $\gamma 0$ of the electrically controlled continuously variable transmission portion 18. FIG. 6 is the table indicating an example of the overall speed positions of the vehicular automatic transmission 40, wherein the first through third overall speed positions are established for the first speed AT gear position, the fourth through sixth overall speed positions are established for the second speed AT gear position, the seventh through ninth overall speed positions are established for the third speed AT gear position, and the tenth overall speed position is established for the fourth speed AT gear position. FIG. 7 is the view indicating an example in which the fourth through sixth overall speed positions of the vehicular automatic transmission 40 are established in the second speed AT gear position of the mechanically operated step-variable transmission portion 20, on a collinear chart similar to that of FIG. 3. In the vehicular automatic transmission 40, the electrically controlled continuously variable transmission portion 18 is controlled to control the engine speed $\omega e$ with respect to the output speed $\omega o$ for establishing the predetermined overall speed ratio values $\gamma t$, to thereby establish the fourth through sixth overall speed positions for the second speed AT gear position.

Referring back to FIG. 1, the vehicle 10 is provided with the control apparatus in the form of the electronic control device 80 configured to control various devices of the vehicle 10 such as the engine 14, the electrically controlled continuously variable transmission portion 18 and the mechanically operated step-variable transmission portion 20. FIG. 1 is the view showing input and output signals of the electronic control device 80, and is a functional block diagram showing major control functions and control portions of the electronic control device 80. For example, the electronic control device 80 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 80 is a shifting control apparatus according to the present invention, and may be constituted by separate control units such as an engine control unit and a hybrid control unit.

The electronic control device 80 receives various input signals from various sensors provided on the vehicle 10, such as: an output signal of an engine speed sensor 60 indicative of the engine speed $\omega e$; an output signal of an MG1 speed sensor 62 indicative of the MG1 speed $\omega g$ which is the operating speed of the first motor/generator MG1; an output signal of an MG2 speed sensor 64 indicative of the MG2 speed $\omega m$ which is the AT input speed $\omega i$; an output signal of an output speed sensor 66 indicative of the output speed $\omega o$ corresponding to the vehicle running speed V; an output signal of an accelerator pedal operation amount sensor 68 indicative of the operation amount $\theta acc$ of a vehicle accelerating member in the form of the accelerator pedal, which operation amount $\theta acc$ represents a degree of acceleration of the vehicle 10 required by the vehicle operator; an output signal of a throttle valve opening angle sensor 70 indicative of an angle $\theta th$ of opening of an electronic throttle valve; an output signal of an oil temperature sensor 72 indicative of a temperature toil of a working fluid used for the hydraulic control unit 54; an output signal of a shift position sensor 74 indicative of a presently selected one of operating positions POSsh of a manually operated shifting member in the form of a shift lever 56 provided on the vehicle 10; and an output signal of a battery sensor 76 indicative of a temperature THbat, a charging/discharging electric current Ibat and a voltage Vbat of the battery 52. Further, the electronic control device 80 generates various output signals to the various devices provided on the vehicle 10, such as: an engine control command signal Se to be applied to an engine control device 58 provided to control a throttle actuator, a fuel injecting device and an ignition device, for controlling the engine 14; motor/generator control command signals Smg to be applied to the inverter 50, for controlling the first motor/generator MG1 and the second motor/generator MG2; and hydraulic control command signals Sat to be applied to the hydraulic control unit 54, for controlling the pump driving electric motor 102 and the operating states of the coupling devices CB (namely, for controlling the shifting actions of the mechanically operated step-variable transmission portion 20). The hydraulic control command signals Sat are command signals (drive currents) to be applied to the hydraulic control unit 54 for controlling amounts of electric currents to be applied to the linear solenoid-operated valves SL1-SL4 which regulate the engaging hydraulic pressure Pcb to be applied to each of the hydraulic actuators 120, 122, 124 and 126 of the coupling devices CB.

The presently selected operating position POSsh of the shift lever 56 is one of: a parking position P; a reverse drive position R; a neutral position N; a forward drive position D; and a sequential mode position S, for example. The parking position P is a position in which the mechanically operated step-variable transmission portion 20 is placed in a neutral state, namely, in a non-power transmittable state with all of the coupling devices CB placed in their released state, and in which the output shaft 22 is mechanically locked to prevent its rotary motion, for thereby holding the vehicular automatic transmission 40 in a parking brake position. The reverse drive position R is a position in which the vehicular automatic transmission 40 is placed in a rear drive state in which the vehicle 10 can be driven in the rearward direction with the MG2 torque TmR while the step-variable transmission portion 20 is placed in the first speed AT gear position. The neutral position N is a position in which the vehicular automatic transmission 40 is placed in a neutral state. The forward drive position D is a position in which the vehicular automatic transmission 40 is placed in a forward drive state in which the vehicle 10 can be driven in the forward direction according to an automatic shifting control of the vehicular automatic transmission 40 to selectively establish one of all of the first through tenth overall speed positions, together with a shifting action from one of the first through fourth speed AT gear positions to another, as needed, or according to a continuously variable shifting control of the electrically controlled continuously variable transmission portion 18. The sequential mode position S is a position located adjacent to the forward drive position. D. When the shift lever 50 is operated from the forward drive position D to the sequential mode position S, a selected one of all of the first through tenth overall speed positions can be established together with a shifting action from one of the first through fourth speed AT gear positions of the step-variable transmission portion 20 to another, as needed, according to a manual operation of a shift-up/shift-down switch or a manual lever. The shift lever 56 is a manually operable shift position switching member to selectively establish one of a plurality of shift positions. In the present embodiment, the shift lever 56 also functions as a sequential mode selector switch for establishing the sequential mode position S.

The electronic control device 80 is configured to calculate a charging state (stored electric power amount) SOC of the battery 52 on the basis of the charging/discharging electric current Ibat and the voltage Vbat of the battery 52. The electronic control device 80 is further configured to calculate, on the basis of, for example, the temperature THbat and the charging state i.e., stored electric power amount SOC of the battery 52, a maximum charging amount Win of electric power that can be stored in the battery 52, and a maximum discharging amount Wout of electric power that can be discharged from the battery 52. The calculated maximum charging and discharging amounts Win and Wout decrease with a decrease of the battery temperature THbat when the battery temperature THbat is lower than a normal level, and decrease with an increase of the battery temperature THbat when the battery temperature THbat is higher than the normal level. Further, the maximum charging amount Win decreases with an increase of the stored electric power amount SOC when the stored. electric power amount SOC is relatively large. The maximum discharging amount Wout decreases with a decrease of the stored electric power amount SOC when the stored electric energy amount SOC is relatively small.

The electronic control device 80 includes a hybrid control portion 82, a continuously variable shifting control portion 84, a step-variable shifting control portion 86, and an overall-speed-position shifting control portion 88, for implementing various controls of the vehicular drive system 12.

The hybrid control portion 82 has a function of an engine control portion to control the engine 14, and a function of a motor/generator control portion to control the first motor/generator MG1 and the second motor/generator MG2 through the inverter 50. Thus, the hybrid control portion 82 performs hybrid drive controls for controlling the engine 14, first motor/generator MG1 and second motor/generator MG2. For example, the hybrid control portion 82 is configured to calculate a required vehicle drive power Pdem on the basis of the accelerator pedal operation amount θacc and the vehicle running speed V, in other words, to calculate a required drive torque Tdem at the present vehicle running speed V. The hybrid control portion 82 generates the engine control command signal Se to control the engine 14, and the motor/generator control command signals Smg to control the first motor/generator MG1 and the second motor/generator MG2, for establishing the required vehicle drive power Pdem, while taking account of the maximum charging and discharging amounts Win and Wout of electric power of the battery 52. For example, the engine control command signal Se represents a command value of an engine power Pe of the engine 14 outputting the torque Te at its present operating speed ωe. For example, the motor/generator control command signals Smg represent a command value of an electric power amount Wg to be generated by the first motor/generator MG1 to generate the reaction torque acting against the engine torque Te, namely, the MG1 torque Tg at the present MG1 speed ωg, and an electric power amount Wm to be consumed by the second motor/generator MG2 to generate the MG2 torque Tm at the present MG2 speed ωm.

The hybrid control portion 82 is configured to selectively establish the motor drive mode or the hybrid drive mode according to the running state of the vehicle 10. For instance, the hybrid control portion 82 establishes the motor drive mode where the required vehicle drive power Pdem is smaller than a predetermined threshold value, that is, falls in a motor drive area in which the vehicle running speed V is relatively low while the vehicle drive torque is relatively small. In the motor drive mode, the vehicle 10 is driven with only the drive force of the second motor/generator MG2, while the engine 14 is held at rest. Alternatively, the hybrid control portion 82 establishes the hybrid drive mode where the required vehicle drive power Pdem is equal to or higher than the predetermined threshold value, that is, falls in a hybrid drive area. In the hybrid drive mode, the vehicle 10 is driven with an operation of the engine 14, while the second motor/generator MG2 is operated with an electric energy generated by a regenerative control of the first motor/generator MG1, and/or an electric energy supplied from the battery 52, to generate a vehicle driving torque for driving the drive wheels 28, whereby an engine assisting drive torque is generated, as needed, to assist the engine 14. Further, the hybrid control portion 82 establishes the hybrid drive mode even where the required vehicle drive power Pdem falls within the motor drive area, if the stored electric power amount SOC or the maximum discharging amount Wout is smaller than a predetermined threshold value. When the vehicle drive mode is switched from the motor drive mode to the hybrid drive mode, the engine 14 can be started by cranking with the first motor/generator MG1 to raise its operating speed ωe, irrespective of whether the vehicle 10 is running or held stationary.

The continuously variable shifting control portion 84 is configured to operate the vehicular automatic transmission 40 as a whole as a continuously variable transmission by controlling the electrically controlled continuously variable transmission portion 18 to perform as a continuously variable transmission. Described in detail, the speed ratio γ0 of the electrically controlled continuously variable transmission portion 18 is varied by continuously shifting control of the continuously variable transmission portion 18 which is executed by controlling, for example, the output of the engine 14 and the electric power Wg generated by the first motor/generator MG1 while taking account of a highest fuel economy line of the engine 14 such that the engine speed ωe and the engine torque Te are controlled to obtain the engine power Pe for establishing the required vehicle drive power Pdem. As a result of this control, the overall speed ratio γt of the vehicular automatic transmission 40 operated as the continuously variable transmission is controlled.

Figure 8:
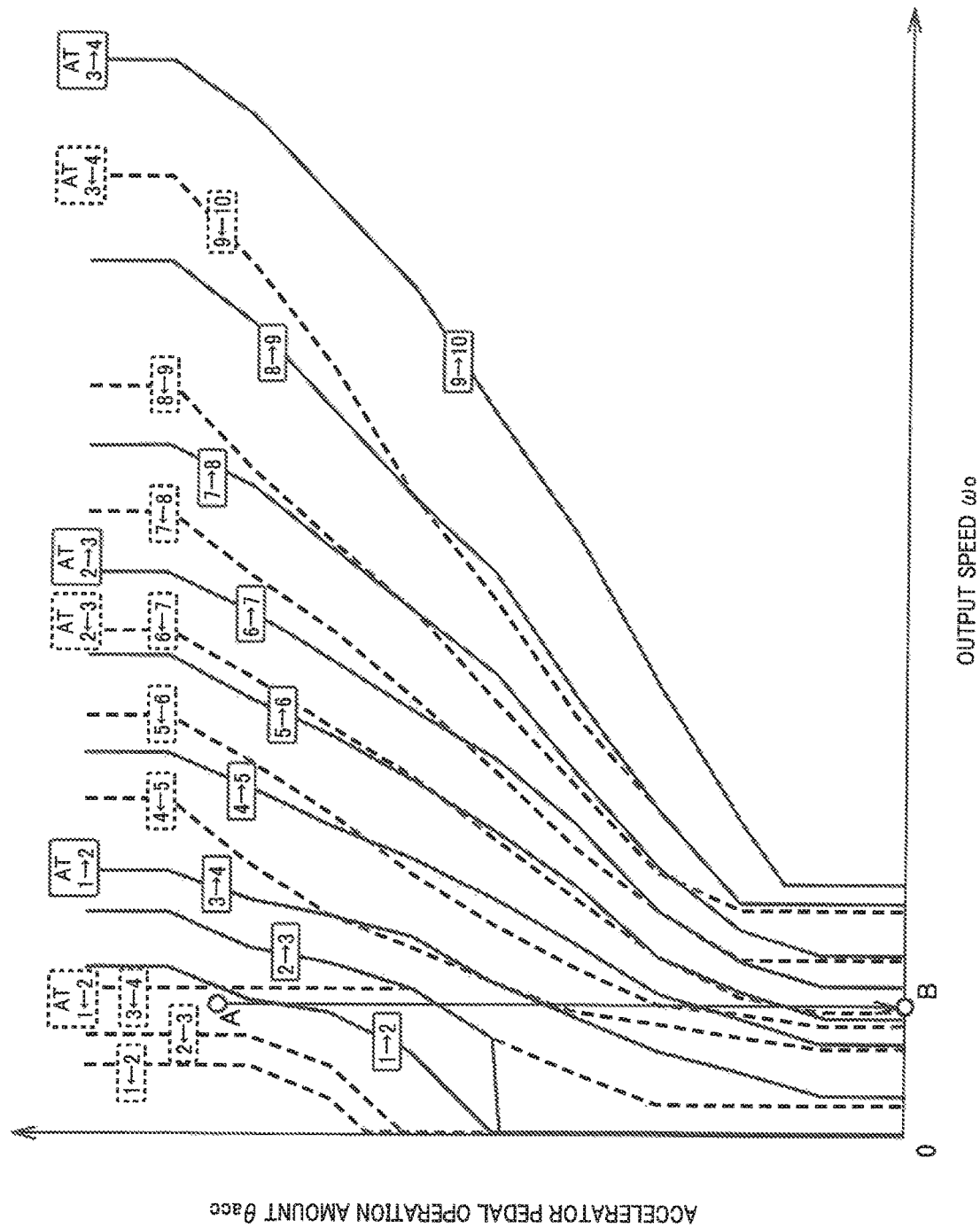
FIG. 8 is a view illustrating an example of an overall speed position shifting map used to shift the automatic transmission to a selected one of the plurality of overall speed positions.

The step-variable shifting control portion 86 is configured to determine a shifting action of the mechanically operated step-variable transmission portion 20 according to a memory-stored AT gear position shifting map obtained by experimentation or theoretical analysis, and to apply the hydraulic control command signals Sat to the hydraulic control unit 54, for commanding the solenoid-operated valves SL1-SL4 to bring the appropriate ones of the coupling devices CB into the released and engaged states, for automatically shifting up or down the mechanically operated step-variable transmission portion 20. The AT gear position shifting map represents conditions of shifting of the step-variable transmission portion 20, and is defined by shifting lines indicated with a symbol "AT" in FIG. 8, by way of example. In FIG. 8, solid lines are shift-up boundary lines while broken lines are shift-down boundary lines. Suitable amounts of hysteresis are provided between the corresponding shift-up and shift-down boundary lines. For example, the AT gear position shifting map represents a predetermined relationship between the output speed ωo (equivalent to the vehicle running speed V) and the accelerator pedal operation amount θacc (equivalent to the required drive torque Tdem or the throttle valve opening angle θth), which relationship is defined in a two-dimensional coordinate system. The AT gear position shifting map is formulated such that the mechanically operated step-variable transmission portion 20 is shifted up to reduce its speed ratio γat as the output speed ωo is raised, and is shifted down to increase its speed ratio γat as the accelerator pedal operation amount θacc is increased. The step-variable shifting control portion 86 is further configured to shift the mechanically operated step-variable transmission portion 20 according to the table of FIG. 6, when the shifting command between different overall speed positions is made based on the driver's operation. For example, the step-variable shifting control portion 86 commands the step-variable transmission portion 20 to be shifted up or down between the first and second speed AT gear positions to shift up or down the vehicular automatic transmission 40 between the third and fourth overall speed positions, or between the second and third speed AT gear positions to shift up or down the vehicular automatic transmission 40 between the sixth and seventh overall speed positions, or between the third and fourth speed AT gear positions to shift up or down the vehicular automatic transmission 40 between the ninth and tenth overall speed positions.

The overall-speed-position shifting control, portion 88 is configured to command the electrically controlled continuously variable transmission portion 18 to be shifted like a step-variable transmission, for shifting the vehicular automatic transmission 40 as a whole like a step-variable transmission. The overall-speed-position shifting control portion 88 determines a shifting action of the vehicular automatic transmission 40 according to a predetermined overall speed position shifting map, and cooperates with the step-variable shifting control portion 86 (configured to control the shifting actions of the mechanically operated step-variable transmission portion 20), to implement a shifting control of the electrically controlled continuously variable transmission portion 18 so as to selectively establish one of the plurality of overall speed positions. Like the AT gear position shifting map, the overall speed position shifting map represents a predetermined relationship between the output speed ωo and the accelerator pedal operation amount θacc. FIG. 8 shows an example of the overall speed position shifting map. Solid lines are shift-up boundary lines while broken lines are shift-down boundary lines. The vehicular automatic transmission 40 in which the electrically controlled continuously variable transmission portion 18 and the mechanically operated step-variable transmission portion 20 are disposed in series with each other is shifted as a whole like a step-variable transmission, when the vehicular automatic transmission 40 is shifted from one of the overall speed positions to another according to the overall speed position shifting map. An overall-speed-position shifting control to shift the vehicular automatic transmission 40 as a whole like the step-variable transmission may be implemented with higher priority to a continuously variable shifting control for shifting the vehicular automatic transmission 40 as a whole like a continuously variable transmission, only where a sporty drive mode or any other drive mode for driving the vehicle 10 with a high degree of drivability is selected by the vehicle operator or where the required drive torque Tdem is comparatively high, for instance. However, the overall-speed-position shifting control may be basically implemented except under a predetermined condition in which this overall-speed-position shifting control should be inhibited. The overall-speed-position shifting control portion 88 is further configured to also implement the overall-speed-position shifting control according to a manual operation of the shift-up/shift-down switch by the vehicle operator, for example.

The overall-speed-position shifting control by the overall-speed-position shifting control portion 88 and the shifting control of the mechanically operated step-variable transmission portion 20 by the step-variable shifting control portion 86 are implemented in cooperation with each other. In the present embodiment, a total of ten overall speed positions, namely, the overall firth through tenth speed positions are assigned to a total of four AT gear positions, namely, the first through fourth speed AT gear positions. According to this assignment, the shifting action (AT1↔2) between the first and second speed AT gear positions is performed when the shifting action (OVERALL3↔4) between the overall third and fourth speed positions is performed, and the shifting action (AT2↔3) between the second and third speed AT gear positions is performed when the shifting action (OVERALL6↔7) between the overall sixth and seventh speed positions is performed. Further, the shifting action (AT3↔4) between the third and fourth speed AT gear positions is performed when the shifting action (OVERALL9↔10) between the overall ninth and tenth speed positions is performed. In this respect, reference is made to FIGS. 6 and 8. The AT gear position shifting map is formulated such that the shifting action between the AT gear positions takes place in synchronization with the corresponding shifting action between the overall speed positions. Described more specifically by reference to FIG. 8, the shift-up boundary lines for the shifting action (OVERALL3→4) from the overall third speed position to the overall fourth speed position, the shifting action (OVERALL6→7) from the overall sixth speed position to the overall seventh speed position and the shifting action (OVERALL9→10) from the overall ninth speed position to the overall tenth speed position are coincident with the respective shift-up boundary lines for the shifting action (AT1→2) from the first speed AT gear position to the second speed AT gear position, the shifting action (AT2→3) from the second speed AT gear position to the third speed AT gear position and the shifting action (AT3→4) from the third speed AT gear position to the fourth speed AT gear position. Similarly, the shift-down boundary lines for the shifting action (OVERALL3←4) from the overall fourth speed position to the overall third speed position, the shifting action (OVERALL6←7) from the overall seventh speed position to the overall sixth speed position and the shifting action (OVERALL9←10) from the overall tenth speed position to the overall ninth speed position are coincident with the respective shift-down boundary lines for the shifting action (AT1←2) from the second speed AT gear position to the first speed AT gear position, the shifting action (AT2←3) from the third speed AT gear position to the second speed AT gear position and the shifting action (AT3←4) from the fourth speed AT gear position to the third speed AT gear position. The step-variable shifting control portion 86 may be commanded to control the mechanically operated step-variable transmission portion 20 on the basis of a determination made according to the overall speed position shifting map to shift the vehicular automatic transmission 40 to the selected overall speed position. Thus, the step-variable shifting control portion 86 controls the shifting action of the step-variable transmission portion 20 between the AT gear positions when the corresponding shifting action of the vehicular automatic transmission 40 between the overall speed positions is performed. Since the shifting action between the AT gear positions is performed in synchronization with the corresponding shifting action between the overall speed positions, the step-variable transmission portion 20 is shifted with a change of the engine speed ωe, so that the vehicle operator is less likely to be given a discomfort due to a shifting shock of the step-variable transmission portion 20, which may be generated in the process of its shifting action.

The overall-speed-position shifting control portion 88 includes a multiple-step shifting control portion in the form of a two-step shifting control portion 90, and a synchronous shifting control portion 98, for implementing synchronous shifting actions of the vehicular automatic transmission 40 and the mechanically operated step-variable transmission portion 20 to respective newly selected (target) ones of the overall speed positions and the AT gear positions. The synchronous shifting control portion 98 is provided to implement a synchronous control of shifting actions of the vehicular automatic transmission 40 and the mechanically operated step-variable transmission portion 20 to the respective target overall speed position and AT gear position in synchronization with each other, irrespective of different control response times of the two shifting actions. In the present embodiment, the synchronous shifting control portion 98 generates a shifting command to establish the newly selected overall speed position, that is, a command to change the torque of the first motor/generator MG1 for changing the engine speed ωe, after a moment of initiation of an inertia phase of the shifting action to establish the newly selected AT gear position, namely, after a moment of detection of a change of the AT input speed ωi (MG2 speed ωm) which is the rotating speed of the intermediate power transmitting member 30. This control of the shifting action to establish the newly selected overall speed position by the synchronous shifting control portion 98 is implemented for both of the shift-up and shift-down actions.

Figure 12:
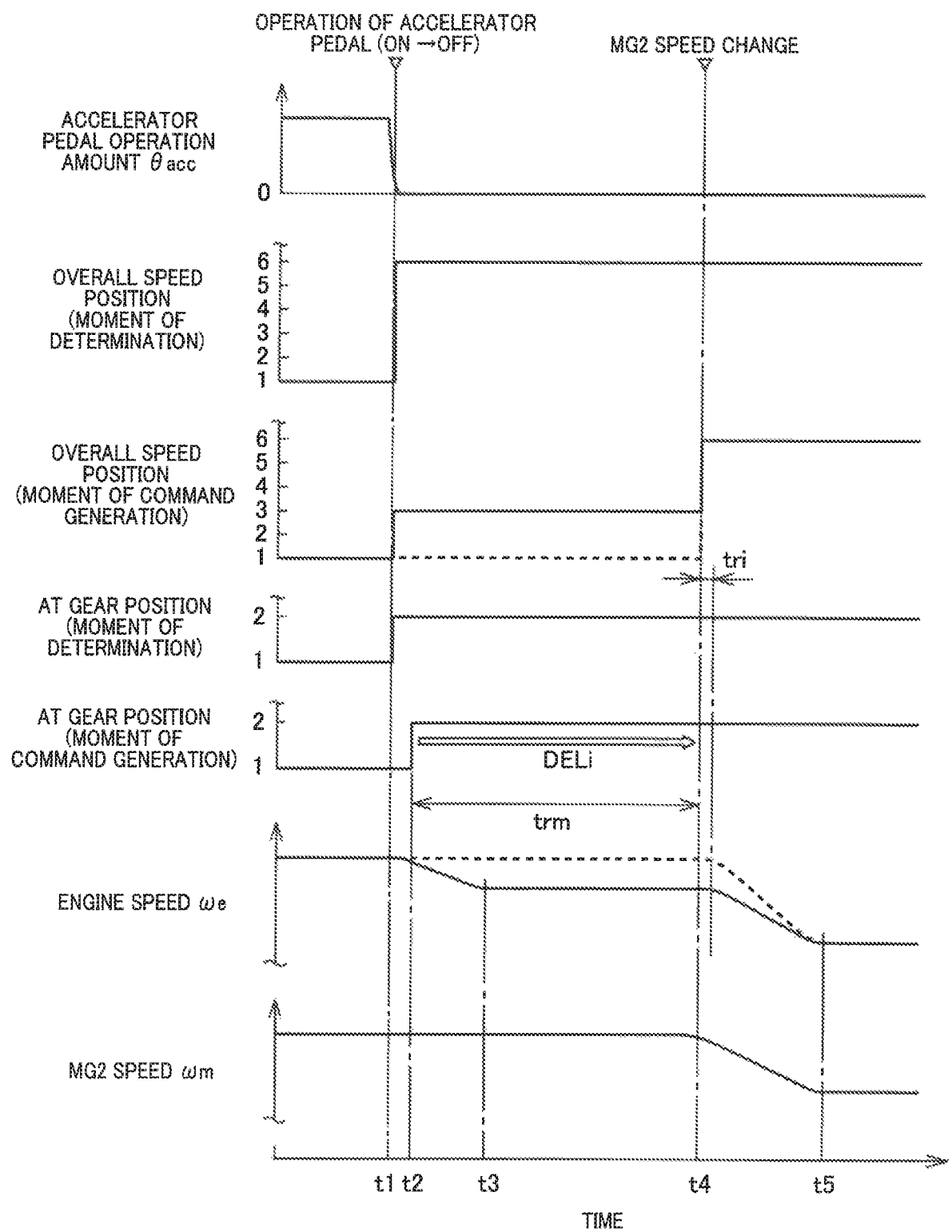
FIG. 12 is a time chart showing an example of changes of various parameters when the automatic transmission is shifted up in a two-step manner from the first overall speed position to the sixth overall speed position through the third overall speed position, according to the control operation of the overall-speed-position shifting control portion illustrated in the flow chart of FIG. 9.
Figure 13:
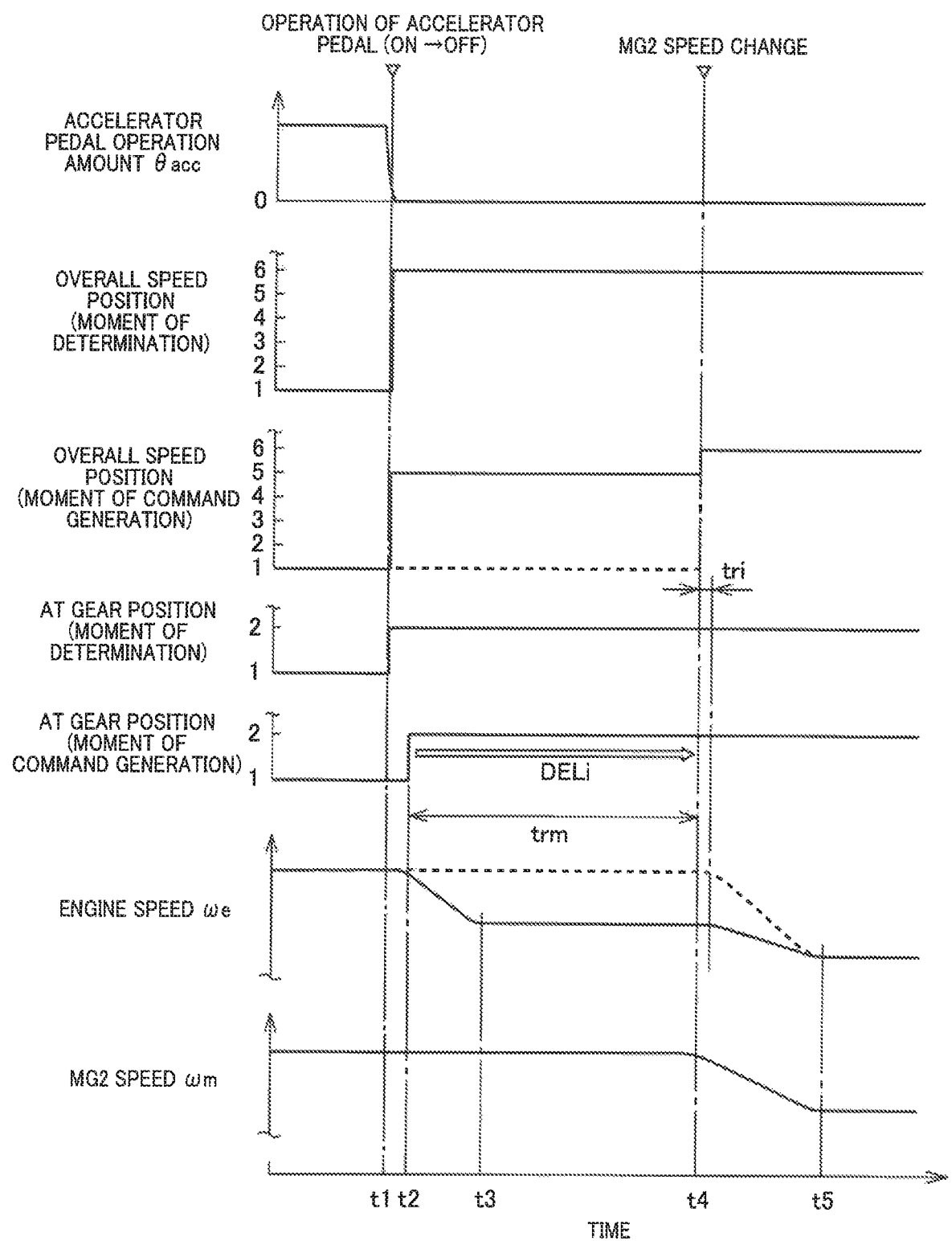
FIG. 13 is a time chart showing an example of changes of the parameters when the automatic transmission is shifted up in a two-step manner from the first overall speed position to the sixth overall speed position through the fifth overall speed position, according to the control operation of the overall-speed-position shifting control portion illustrated in the flow chart of FIG. 9

FIGS. 12 and 13 are the time charts showing examples of changes of various parameters when the vehicular automatic transmission 40 is shifted up from the overall first speed position to the overall sixth speed position in synchronization with the shift-up action of the step-variable transmission portion 20 from the first speed AT gear position to the second speed AT gear position. In these time charts, "t2" represents a moment of generation of a command to implement the shift-up action to the second speed AT gear position, and "t4" represents the moment of initiation of the inertia phase of the shift-up action to the second speed AT gear position, at which reduction of the MG2 speed ωm is initiated as a result of the shift-up action. Namely, a length of time from the point of time t2 to the point of time t4 is a control response time "trm" of the shift-up action from the first speed AT gear position to the second speed AT gear position. A command to implement the shift-up action to the overall sixth speed position which is the newly selected (target) overall speed position is generated at the moment of initiation of the inertia phase of the shift-up action to the second speed AT gear position, that is, at the point of time t4. In other words, the moment of generation of the command to implement the shift-up action to the overall sixth speed position is delayed with respect to the moment of generation of the command to implement the shift-up action to the second speed AT gear position, by a delay time DELi which is equal to the control response time "trm". A control response time of the shift-up action to the overall sixth speed position is equal to a delay time "tri" which is a length of time from the point of time t4 (at which the command to implement the shift-up action to the overall sixth speed position is generated) to a moment of initiation of an inertia phase of the shift-up action to the overall sixth speed position, at which reduction of the engine speed ωe is initiated as a result of the shift-up action. Since this control response time "tri" is short, the reduction of the MG2 speed ωm as a result of the shift-up action to the second speed AT gear position and the reduction of the engine speed ωe as a result of the shift-up action to the overall sixth speed position are considered to take place substantially concurrently with each other. Thus, the shift-up action of the mechanically operated step-variable transmission portion 20 to the second speed AT gear position and the shift-up action of the vehicular automatic transmission 40 to the overall sixth speed position are performed in synchronization with each other such that the inertia phases of the two shift-up actions at least partially overlap each other, irrespective of a difference between the control response times "trm" and "tri" of the two shift-up actions, so that the degree of discomfort given to the vehicle operator due to different timings of the two shift-up actions and the shifting shock of the mechanically operated step-variable transmission portion 20 is reduced, and the drivability of the vehicle 10 is improved. In the examples of FIGS. 12 and 13, the shift-up actions to the second speed AT gear position and the overall sixth speed position are terminated substantially simultaneously at a point of time t5.

On the other hand, where the moment of generation of the command to establish the target overall speed position is delayed such that the shifting action to the target overall speed position is performed in synchronization with the shifting action to establish the corresponding newly selected AT gear position, the engine speed ωe is kept at a relatively high value until the shifting action to establish the newly selected AT gear position is initiated, if the vehicular automatic transmission 40 is automatically shifted up as a result of a releasing operation of the accelerator pedal or shifted up as a result of an operation of the shift-up/shift-down switch or any other member manually operated by the vehicle operator. This shift-up action of the vehicular automatic transmission 40 gives rise to a risk of the vehicle operator feeling that the engine speed ωe is kept at a relatively high value for an excessively long length of time, namely until the shift-up action of the step-variable transmission portion 20 is actually initiated, and a risk of deterioration of the fuel economy of the engine 14. Further, the control response of the shift-up actions to establish the newly selected AT gear position and overall speed position is different from the control response of the shift-up action performed to establish only the newly selected overall speed position. This difference of the control responses gives rise to a risk that the vehicle operator is given discomfort during the shift-up actions of the step-variable transmission portion 20 and the vehicular automatic transmission 40. In the examples of the time charts of FIGS. 12-14, the determinations to perform the shift-up actions for establishing the newly selected AT gear position and overall speed position are made at a point of time t1 as a result of a releasing operation of the accelerator pedal from its ON state to its OFF state, and the command to implement the shift-up action to establish the newly selected AT gear position is generated at the point of time t2 which is a predetermined waiting time after the point of time t1, in order to prevent "busy shifting" operations of the vehicular automatic transmission 40. The command to implement the shift-up action to establish the newly selected overall speed position (overall sixth speed position) is generated at the point of time t4 which is the delay time DELi after the point of time t2, so that the vehicular automatic transmission 40 is shifted up from the overall first speed position eventually to the newly selected overall sixth speed position. Accordingly, the engine speed ωe is kept at the relatively high value for the excessively long length of time as felt by the vehicle operator, namely, before initiation of reduction of the engine speed ωe, and the fuel economy of the engine 14 may be deteriorated.

In the present embodiment, the two-step shifting control portion 90 is provided to reduce the above-indicated risk of the vehicle operator feeling that the engine speed ωe is kept at the relatively high value for the excessively long length of time, and the risk of deterioration of fuel economy of the engine 14. When the vehicular automatic transmission 40 is shifted up from the present overall speed position to the target overall speed position in synchronization with the shift-up action of the mechanically operated step-variable transmission portion 20 from the present AT gear position to the target AT gear position, under the control of the synchronous shifting control portion 98, the two-step shifting control portion 90 commands the vehicular automatic transmission 40 to be once shifted up from the present overall speed position to an intermediate overall speed position between the present overall speed position and the target overall speed position, rather than commanding the vehicular automatic transmission 40 to be shifted up directly to the target overall speed position. The two-step shifting control portion 90 includes (a) a multiple-step shifting determining portion in the form of a two-step shifting determining portion 92 configured to determine, according to a predetermined condition for implementing a two-step shifting control, whether the vehicular automatic transmission 40 should be initially shifted to the intermediate overall speed position, (b) an intermediate overall speed position selecting portion 94 configured to select the intermediate overall speed position, according to the running state of the vehicle 10, and (c) a multiple-step shifting commanding portion in the form of a two-step shifting commanding portion 96 configured to command the vehicular automatic transmission 40 to be shifted up to the intermediate overall speed position, at a predetermined timing after the moment of determination to shift the vehicular automatic transmission 40 to the target overall speed position. Steps S1-S10 illustrated in the flow chart of FIG. 9 indicate details of operations of the two-step shifting control portion 90 and the synchronous shifting control portion 98. The steps S1, S2, S9 and S10 correspond to a function of the synchronous shifting control portion 98, the steps S3 and S4 correspond to a function of the two-step shifting determining portion 92, the steps S5-S7 correspond to a function of the intermediate overall speed position selecting portion 94, and the step S8 corresponds to a function of the two-step shifting commanding portion 96.

Figure 9:
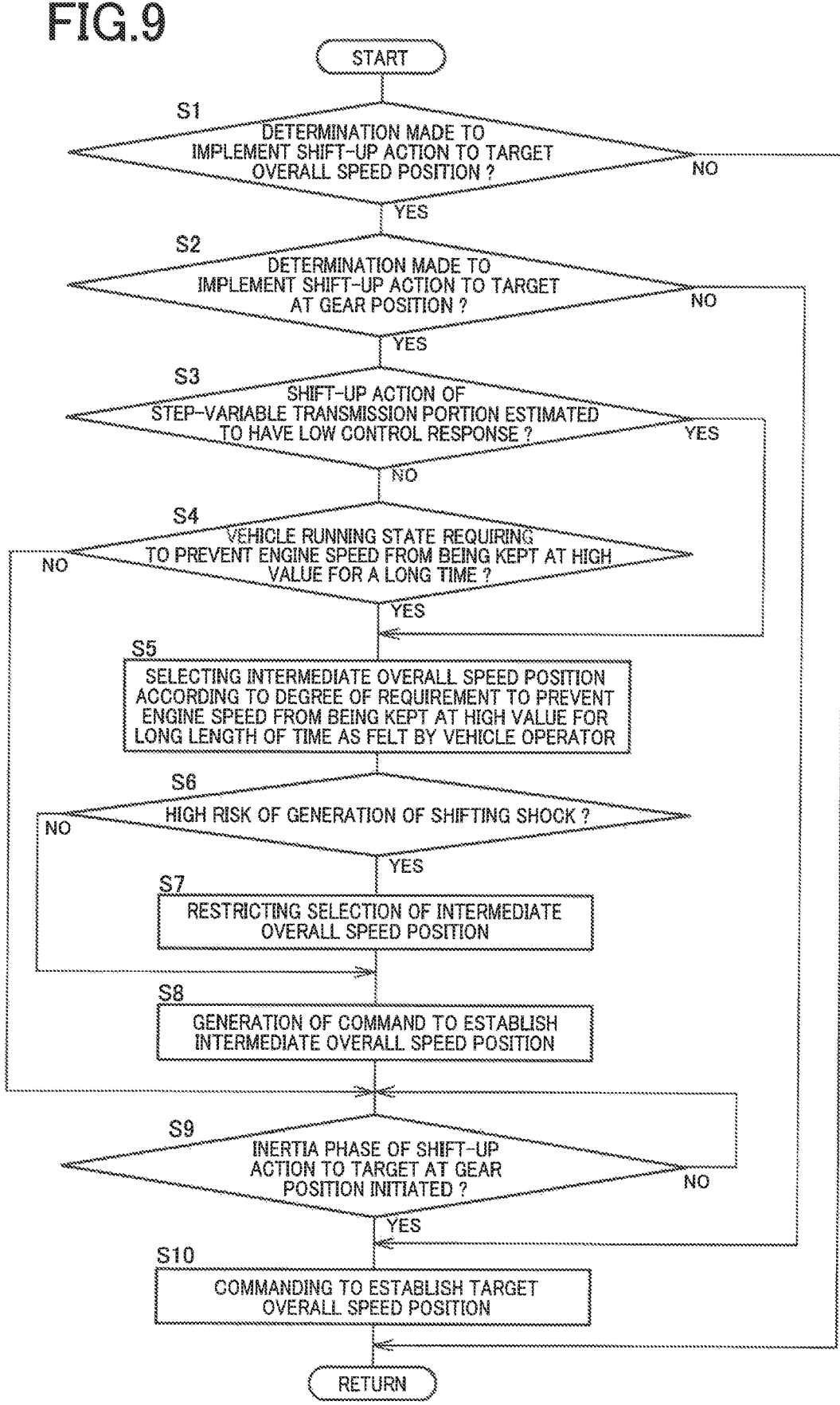
FIG. 9 is a flow chart illustrating control operations of a two-step shifting control portion and a synchronous shifting control portion of an overall-speed-position shifting control portion shown in FIG. 1.

A control routine illustrated in the flow chart of FIG. 9 is initiated with a step S1 to determine whether the determination to implement a shift-up action to establish a target (newly selected) overall speed position has been made. This determination is made according to the overall speed position shifting map, or on the basis of a shift-up command generated by the shift-up/shift-down switch or any other manually operated member. If a negative determination is obtained in the step S1, one cycle execution of the control routine is terminated. If an affirmative determination is obtained in the step S1, the control flow goes to a step S2 to determine whether the shift-up action to establish the target overall speed position is performed together with a shift-up action to establish a target (newly selected) AT gear position, namely, to determine whether the determination to implement the shift-up action to establish the target AT gear position has also been made by the step-variable shifting control portion 86. If a negative determination is obtained in the step S2, that is, if only the determination to implement the shift-up action to establish the target overall speed position has been made, without the determination to implement the shift-up action to establish the target gear position, the control flow goes directly to a step S10 to generate the command to establish the target overall speed position. Namely, a target value $\omega e^*$ of the engine speed $\omega e$ of the target overall speed position is obtained on the basis of the present output speed too, and according to the map of FIG. 8 representing the relationship between the output speed $\omega o$ and the engine speed $\omega e$, and the torque of the first motor/generator MG1 is controlled so as to establish the obtained target engine speed value $\omega e^*$, whereby the target overall speed position is straightly established.

If an affirmative determination is obtained in the step S2, that is, if the determination to implement the shift-up action to establish the target overall speed position together with the shift-up action to establish the target AT gear position has been made, the control flow goes to a step S3. In the examples of the time charts of FIGS. 12-147, the determination to implement the shift-up action from the overall first speed position to the overall sixth speed position is made substantially concurrently with the determination to implement the shift-up action from the first speed AT gear position to the second speed AT gear position, at the point of time t1, as a result of the releasing operation of the accelerator pedal from its ON state to its OFF state. Referring to the shifting map of FIG. 8, if the accelerator pedal is abruptly released such that its operation amount θacc is abruptly reduced from a point A, at which the operation amount θacc is relatively large, during starting or acceleration of the vehicle 10, to a zero point B, for example, the determinations to implement the shift-up action to establish the target AT gear position and the target overall speed position are made substantially concurrently with each other. The collinear chart of FIG. 10 indicates an example of changes of the rotating speeds of the various portions of the electrically controlled continuously variable transmission portion 18 and the mechanically operated step-variable transmission portion 20, where the electrically controlled continuously variable transmission portion 18 is controlled to shift the vehicular automatic transmission 40 from the overall first speed position to the overall sixth speed position while the mechanically operated step-variable transmission portion 20 is shifted from the first speed AT gear position to the second speed AT gear position. Solid lines indicate the AT gear positions and the overall speed positions prior to the shift-up actions, while one-dot chain lines indicate the target positions established after the shift-up actions. As a result of these shift-up actions, the input speed $\omega i$ of the mechanically operated step-variable transmission portion 20 and the engine speed $\omega e$ are reduced according to the speed ratios γat and γt of the respective step-variable and continuously variable transmission portions 20 and 18. It is noted that as a result of the determination to implement the shift-up action to establish the target AT gear position, the step-variable shifting control portion 86 generates the command to implement the shift-up action from the first speed AT gear position to the second speed AT gear position at time t2. Described more specifically, the hydraulic control command signal Sat is generated so that the brake B1 placed in the released state to establish the first speed AT gear position is brought into the engaged state to establish the second speed AT gear position in which the clutch C1 is also placed in the engaged state. In the presence of the one-way clutch F1, the brake B2 is placed in its released state in the second speed AT gear position, so that the brake B2 need not be brought into the released state.

In the step S3, a determination is made as to whether the present running state of the vehicle 10 satisfies a condition for implementing the two-step shifting control to shift the vehicular automatic transmission 40 eventually to the target overall speed position through the intermediate overall speed position, namely, as to whether the shift-up action to establish the target AT gear position is estimated to have a low control response in the present running state of the vehicle 10, in other words, as to whether the vehicle operator is likely to feel that the engine speed $\omega e$ is kept at a relatively high value for an excessively long length of time, in the present running state of the vehicle 10. For instance, an affirmative determination is obtained in the step S3 where the accelerator pedal is released from its ON state to its OFF state, or where the working fluid temperature toil is lower than a predetermined lower limit. Described more specifically, the shift-up action of the mechanically operated step-variable transmission portion 20 to the target AT gear position just after the accelerator pedal has been switched from its ON state to its OFF state is not generally required to have a high degree of control response, so that this shift-up action is controlled to take place for a relatively long length of time, for reducing a shifting shock of the mechanically operated step-variable transmission portion 20. Where the temperature toil of the working fluid in the hydraulic control unit 54 is relatively low, and the viscosity of the working fluid is relatively high, the control response of the engaging or releasing action of each coupling device CB is relatively low, so that a relatively long length of time is required until the inertia phase of the shift-up action to establish the target AT gear position is initiated. If the affirmative determination is obtained in the step S3, the control flow goes to steps S5-S8 for implementing the two-step shifting control to eventually establish the target overall speed position. If a negative determination is obtained in the step S3, the control flow goes to a step S4 to determine whether it is required to prevent the engine speed ωe being kept at a relatively high value for an excessively long length of time, that is, whether the running state of the vehicle 10 has a risk of the engine speed ωe being kept at the relatively high value for the excessively long length of time, and a risk of consequent deterioration of the fuel economy of the engine 14. For instance, it is considered that the vehicle operator expects that the engine speed ωe quickly drops down as a result of the releasing operation of the accelerator pedal, where the speed of releasing of the accelerator pedal is higher than a predetermined upper limit, where the amount of reduction of the operation amount θacc of the accelerator pedal is larger than a predetermined upper limit, or where the operation amount θacc after the releasing operation of the accelerator pedal is smaller than a predetermined lower limit. In these cases, it is determined that it is necessary to prevent the engine speed ωe being kept at the relatively high value for the excessively long length of time. In the step S4, the determination may be made with respect to all of the speed of releasing of the accelerator pedal, the amount of reduction of the operation amount θacc and the operation amount θacc after the releasing operation of the accelerator pedal. In this case, the affirmative determination is obtained in the step S4, if any one of the above-indicated three parameters satisfies the condition described above. However, the determination in the step S4 may be made with respect to only one or two of the three parameters. The speed and amount of releasing the accelerator pedal is a rate and variation amount of reduction of the operation amount θacc, respectively. If an affirmative determination is obtained in the step S4, the control flow goes to the steps S5-S8 for implementing the two-step shifting control to eventually establish the target overall speed position. If a negative determination is obtained in the step S4, that is, the negative determinations are obtained in both of the steps S3 and S4, it is determined that it is not necessary to implement the two-step shifting control, so that the control flow goes to a step S9. The conditions for implementing the two-step shifting control, which are used in the determinations in the steps S3 and S4, are suitably determined, and the determination may be made with respect to only one of these two conditions, and any other condition may be set for implementing the two-step shifting control.

In the step S5, the intermediate overall speed position is selected according to a degree of requirement to prevent the engine speed ωe from being kept at the relatively high value for the excessively long length of time as felt by the vehicle operator. Described more specifically, the intermediate overall speed position is selected according to the speed of releasing of the accelerator pedal, the amount of reduction of its operation amount θacc and the operation amount θacc after its releasing operation, such that the selected intermediate overall speed position comes closer to the target overall speed position with an increase of the speed of releasing of the accelerator pedal, with an increase of the amount of reduction of its operation amount θacc, and with a decrease of the operation amount θacc after its releasing operation. The intermediate overall speed position may be selected according to any one of the speed of releasing of the accelerator pedal, the amount of reduction of its operation amount θacc and the operation amount θacc after its releasing operation. Described in detail with respect to the speed of releasing of the accelerator pedal, one of the overall speed positions between the present speed position and the target speed position is selected as the intermediate overall speed position according to the speed of releasing of the accelerator pedal. If there is only one overall speed position between the present and target speed positions, that one overall speed position is selected as the intermediate overall speed position. Where there are two or more speed positions between the present speed position (e.g., the first speed position) and the target speed position (e.g., the sixth speed position), the fourth or fifth speed position is selected as the intermediate overall speed position when the speed of releasing of the accelerator pedal is comparatively high, and the second or third speed position is selected as the intermediate overall speed position when the speed of releasing of the accelerator pedal is comparatively low. Similarly, the intermediate overall speed position is selected depending upon whether the amount of reduction of the operation amount θacc is comparatively large or small, or whether the operation amount θacc after the releasing operation is comparatively large or small. However, a predetermined one of the overall speed positions between the present and target speed positions may be selected as the intermediate overall speed position. For example, the speed position (e.g., fifth speed position) next lower than the target speed position (e.g., sixth speed position), the speed position (e.g., second speed position) next higher than the present speed position (e.g., first speed position), or the speed position (e.g., third or fourth speed position) intermediate between the present and target speed positions (e.g., first and sixth speed positions) may be selected as the intermediate overall speed position.

In the step S5, the intermediate overall speed position is basically selected within a range of the overall speed positions assigned to the AT gear position established prior to the synchronous shifting actions, to reduce the risk of generation of the shifting shock in the process of the synchronous shifting actions. However, where the engine speed ωe is likely to be kept at the relatively high value for the excessively long length of time as felt by the vehicle operator in the present running state of the vehicle 10, in other words, where the degree of requirement to prevent the engine speed ωe from being kept at the relatively high value for the excessively long length of time is high, the intermediate overall speed position may be selected outside the range assigned to the AT gear position established prior to the synchronous shifting actions. For example, where the first speed AT gear position is established prior to the synchronous shifting actions, the first through third overall speed positions are assigned to the first speed AT gear position, as indicated in. FIG. 6, so that one of the first through third overall speed positions is basically selected as the intermediate overall speed position. In this case, the vehicular automatic transmission 40 is shifted from the intermediate overall speed position selected within the range of FIG. 6, to the target overall speed position, together with the concurrent shifting action of the mechanically operated step-variable transmission portion 20 from the first speed AT gear position, so that the drivability of the vehicle 10 is improved without generation of a shifting shock of the vehicular automatic transmission 40. However, the intermediate overall speed position may be selected not only from the range assigned to the first speed AT gear position, but also from the range assigned to the target second speed AT gear position, namely, from among the overall fourth through sixth speed positions, in order to reduce a possibility of the engine speed ωe being kept at the relatively high value for the excessively long length of time, rather than to effectively improve the drivability of the vehicle 10 without generation of the shifting shock, where the degree of requirement to prevent the engine speed ωe from being kept at the relatively high value for the excessively long length of time is high, for instance, where an operating sound of the engine 14 is easily audible at a low running speed V of the vehicle 10, where the engine speed ωe is relatively high, where the operation amount θacc of the accelerator pedal after its releasing operation is not larger than the predetermined value, where the speed of releasing of the accelerator pedal is not lower than the predetermined value, where the amount of reduction of the operation amount θacc is not smaller than the predetermined value, or where the shift-up action to the target AT gear position has a long control response time causing the engine speed ωe to be kept at the relatively high value for the excessively long length of time (in case of e.g. power-off shift-up action). In the example of FIG. 13, the intermediate overall speed position is selected outside the range assigned to the AT gear position established prior to the synchronous shifting actions, that is, the overall fifth speed position is selected, according to the operation amount θacc of the accelerator pedal after its releasing operation, the speed of releasing of the accelerator pedal, and the amount of reduction of the operation amount θacc. In this example, the shift-up action to the intermediate overall speed position of the vehicular automatic transmission 40 permits a large amount of reduction of the engine speed ωe, and effective reduction of the risk of the vehicle operator feeling that the engine speed ωe is kept at the relatively high value for the excessively long length of time, and the risk of deterioration of the fuel economy of the engine 14. It is noted that where the degree of requirement to prevent the engine speed ωe from being kept at the relatively high value for the excessively long length of time is extremely high, for example, where the operation amount ωacc of the accelerator pedal after its releasing operation is zero, the target overall speed position according to the overall speed position shifting map may be selected as the intermediate overall speed position. In the example of the time chart of FIG. 14, the target overall speed position (overall sixth speed position) is selected as the intermediate overall speed position, in the step S5.

The step S5 is followed by a step S6 to determine whether there is a high risk of generation of a shifting shock of the mechanically operated step-variable transmission portion 20. The risk of generation of the shifting shock is considered to be high where the working fluid temperature toil is not higher than the predetermined lower limit, and the viscosity of the working fluid is relatively high, so that the accuracy of control of the engaging and releasing actions of each coupling device CB is low. The risk of generation of the shifting shock is also considered to be high where the temperature of the first or second motor/generator MG1 or MG2 or the inverter 50 is relatively high, and the maximum charging or discharging amount Win or Wout of the battery 52 is limited on the basis of the battery temperature THbat or the electric power amount SOC stored in the battery 52. In this case, the torque of the first or second motor/generator MG1, MG2 is limited, and the accuracy of control of the engine speed ωe and the input speed ωn by controlling the MG1 and MG2 torques is lowered. Namely, the risk of generation of the shifting shock can be considered to be high, where the maximum charging or discharging amount Win or Wout of the battery 52 is not larger than a predetermined lower limit, or where the temperature of the motor/generator MG1 or MG2 or the inverter 50 is not higher than a predetermined lower limit.

If it is determined in the step S6 that there is a high risk of generation of the shifting shock, that is, if an affirmative determination is obtained in the step S6, the control flow goes to a step S7 to restrict the selection of the intermediate overall speed position. If a negative determination is obtained in the step S6, the control flow goes to a step S8 while skipping the step S7. In the step S7, the selection of the intermediate overall speed position is restricted according to the table of FIG. 6 indicating the relationship between the overall speed positions and the AT gear positions, more specifically; limited to within the range assigned to the AT gear position established prior to the synchronous shifting actions, in order to reduce, with higher priority, the risk of deterioration of the drivability of the vehicle 10 due to the shifting shock, rather than the risk of deterioration in the vehicle operator feeling and the risk of deterioration of the fuel economy of the engine 14 due to the engine speed ωe kept at the relatively high value for the excessively long length of time. Where the first speed AT gear position is established prior to the synchronous shifting actions, the selection of the intermediate overall speed position is limited to one of the overall first through third speed positions. Where the overall fourth or higher speed position is selected as the intermediate overall speed position in the step S5, the once selected intermediate overall speed position is replaced by the overall third speed position. In the example of the time chart of FIG. 12, the overall third speed position is selected as the intermediate overall speed position, according to the restriction in the step S7. The restriction of the selection of the intermediate overall speed position as described above permits adequate implementation of the shift-up action to establish the target overall speed position through the restricted intermediate overall speed position, synchronized with the shift-up action to establish the target AT gear position as shown in the table of FIG. 6, while reducing the risk of the vehicle operator feeling that the engine speed cog is kept at the relatively high value for the excessively long length of time, so that the risk of deterioration of the drivability of the vehicle 10 due to the shifting shock can be adequately reduced.

Figures 10, 11:
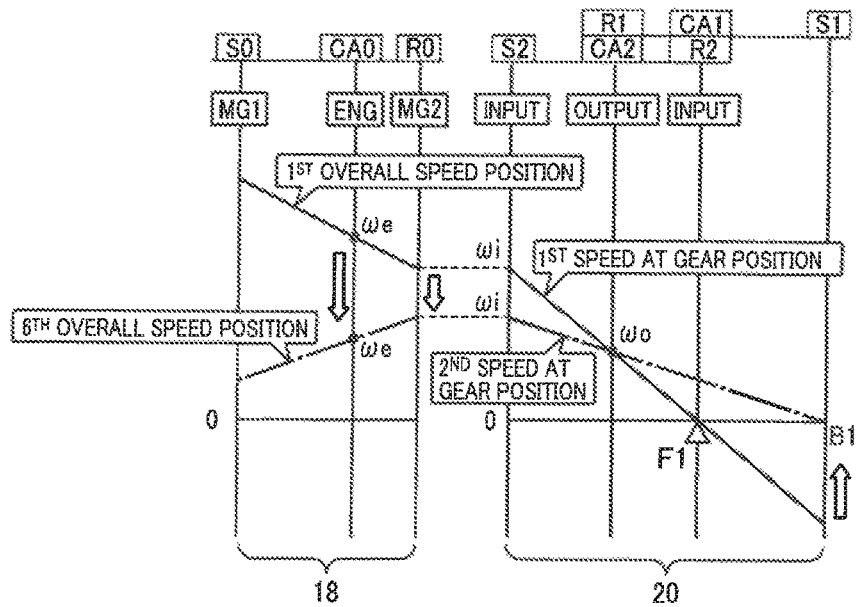
FIG. 10 is a collinear chart indicating a shift-up action of the vehicular automatic transmission from the first overall speed position to the sixth overall speed position, and a shift-up action of the step-variable transmission portion from the first speed AT gear position to the second speed AT gear position.
FIG. 11 is a table indicating the overall speed positions to which the automatic transmission can be shifted up and down, in each of the AT gear positions.

The restriction of the selection of the intermediate overall speed position in the step S7 may be implemented, not according to the table of FIG. 6. For instance, the selection of the intermediate overall speed position is limited to within a predetermined range of the overall speed positions available for each of the AT gear position established prior to the synchronous shifting actions, depending upon whether the mechanically operated step-variable transmission portion 20 is automatically shifted or manually shifted, whether the working fluid temperature toil is held within a normal range or higher than a predetermined upper limit, and/or whether the mechanically operated step-variable transmission portion 20 is shifted up or shifted down, as indicated in FIG. 11. Where the AT gear position established prior to the synchronous shift-up actions is the first speed AT gear position, for instance, the selection of the overall speed position is limited to one of the overall first through third speed positions, when the mechanically operated step-variable transmission portion 20 is automatically shifted up. Further, the selection of the intermediate overall speed position is limited to one of the overall first through third speed positions, where the mechanically operated step-variable transmission portion 20 is manually shifted up while the working fluid temperature toil is held within the normal range, or to one of the overall first through fourth speed positions, where the mechanically operated step-variable transmission portion 20 is manually shifted up while the working fluid temperature toil is higher than the upper limit. The flow chart of FIG. 9 illustrates the control routine where the vehicular automatic transmission 40 is shifted up to the target overall speed position. However, the present embodiment is configured to implement the two-step shifting control of the shift-down action to establish the target overall speed position through the intermediate overall speed position, prior to the synchronous shift-down actions, when the predetermined condition is satisfied, as in the case where the synchronous two-step shifting control is implemented with respect to the shift-up action. FIG. 11 also indicates the overall speed positions available for each of the shift-down actions of the mechanically operated step-variable transmission portion 20, to which the selection of the intermediate overall speed position is limited.

Figure 14:
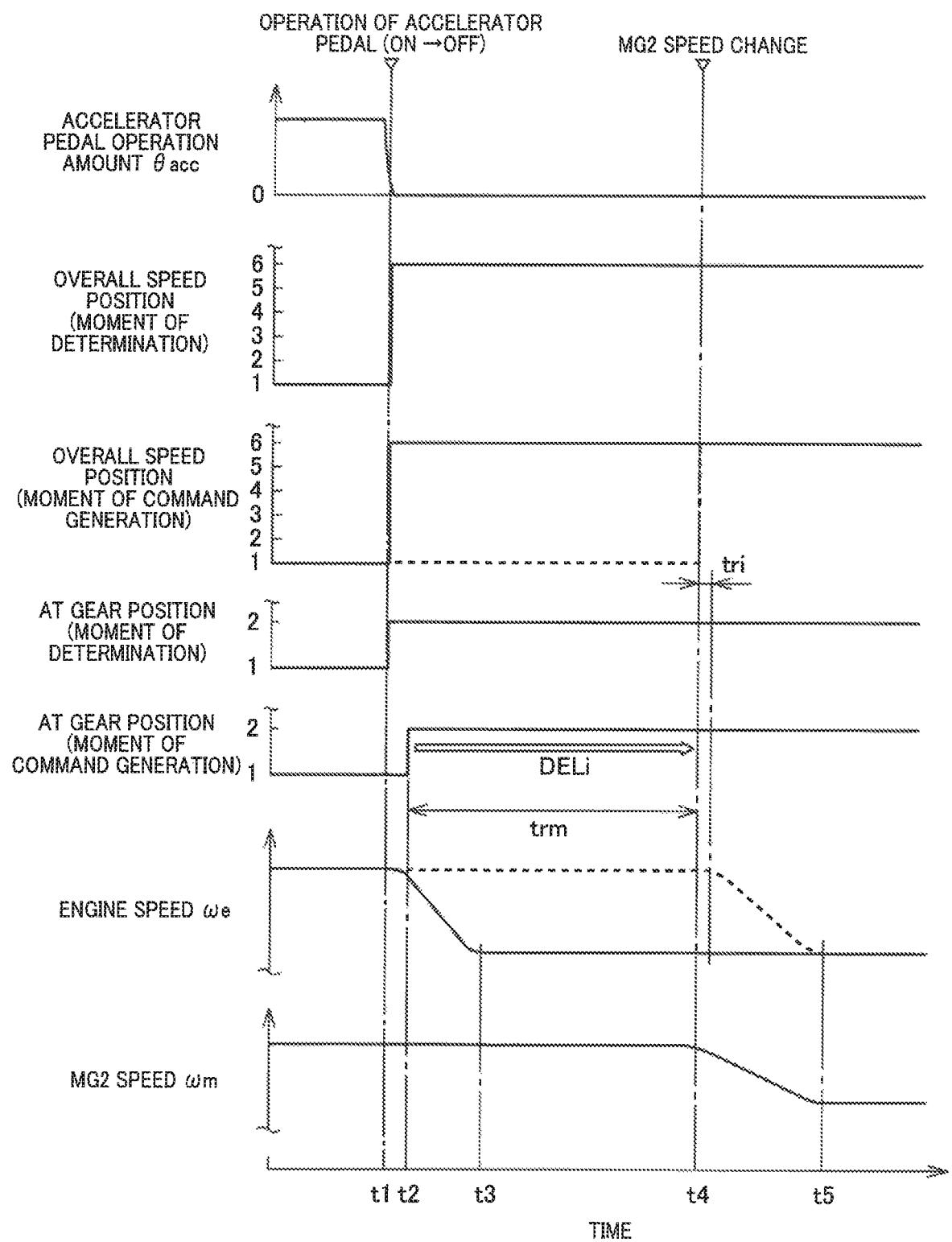
FIG. 14 is a time chart showing an example of changes of the parameters when the automatic transmission is shifted up from the first overall speed position to the sixth overall speed position, without a change of the AT gear position, according to the control operation of the overall-speed-position shifting control portion illustrated in the flow chart of FIG. 9.

In the step S8, a command to shift up the vehicular automatic transmission 40 to the intermediate overall speed position selected in the step S5 or restricted in the step S7, is generated at a predetermining timing. In the present embodiment, the command to establish the intermediate overall speed position is generated through the processing operations in the steps S2-S7, at the earliest possible point of time after the moment at which the determination to implement the shift-up action to establish the target overall speed position is made. Namely, in the examples of the time charts of FIGS. 12-14 wherein the determinations to implement the shift-up actions establish the target overall speed position and the target AT gear position are made at the point of time t1 as a result of the releasing operation of the accelerator pedal from its ON state to its OFF state, the command to establish the intermediate overall speed position is generated immediately after the moment at which the above-indicated determinations are made. Described more specifically, the command to establish the overall third speed position is immediately generated in the example of FIG. 12, and the command to establish the overall fifth speed position is immediately generated in the example of FIG. 13, while the command to establish the overall sixth speed position is immediately generated in the example of FIG. 14. "t3" in the time charts of FIGS. 12-14 represents a point of time at which the shift-up action to establish the intermediate overall speed position is terminated. During a time period from the point of time t2 to the point of time t3, the engine speed $\omega e$ is lowered at a high rate according to the speed ratio $\gamma t$ of the intermediate overall speed position. In the example of FIG. 14 in which the overall sixth speed position is selected as the intermediate overall speed position, the engine speed $\omega o$ is rapidly lowered as a result of the shift-up action from the overall first speed position to the overall sixth speed position, so that the requirement by the vehicle operator with respect to a rate of change of the engine speed $\omega e$ after the operation of the accelerator pedal to its fully released position can be satisfied. In this case, the reduction of the MG2 speed $\omega m$ is initiated at the point of time t4 as a result of the shift-up action of the mechanically operated step-variable transmission portion 20 from the first speed AT gear position to the second speed AT gear position. Although the moment at which the reduction of the MG2 speed $\omega m$ is initiated is delayed with respect to the moment at which the reduction of the engine speed $\omega e$ is initiated, the vehicle operator is not likely to feel uncomfortable with the shift-up action to the second AT gear position, since the rate of drop of the engine speed $\omega e$ as a result of the shift-up action to the overall sixth speed position is considerably high.

In the step S9, a determination is made as to whether the shift-up action of the mechanically operated step-variable transmission portion 20 from the first speed AT gear position to the second speed AT gear position has progressed into the inertia phase under the control of the step-variable shifting control portion 86. The step-variable shifting control portion 86 generates, at the point of time t2, the command to shift, up the mechanically operated step-variable transmission portion 20 from the first speed AT gear position to the second speed AT gear position, that is, generates the hydraulic control command signal Sat for bringing the brake B1 into its engaged state, so that this shift-up action is actually initiated at the point of time t4, namely, the inertia phase of the shift-up action is initiated with initiation of reduction of the input speed $\omega i$ (MG2 speed $\omega m$) at the point of time t4 which is the control response time trm after the point of time t2. Accordingly, an affirmative determination is obtained in the step S9 at the point of time t4. The determination as to whether the inertia phase has been initiated or not is made to implement a synchronous control of the shift-up actions to the target overall sixth speed position and the target second speed AT gear position such that the inertia phases of these two shift-up actions at least partially overlap each other. However, the moment of initiation of the inertia phase of the shift-up action to the second speed AT gear position need not be accurately detected. For example, the determination in the step S9 may be made depending upon whether the predetermined delay time DELi has passed from the moment of generation of the command to establish the second speed AT gear position, that is, from the point of time t2. The delay time DELi may be a constant value irrespective of the kind of the shift-up action of the mechanically operated step-variable transmission portion 20. Alternatively; the delay time DELi may be determined by experimentation or simulation according to the kind of the shift-up action, more specifically; the present and target AT gear positions. Further, parameters other than the kind of the shift-up action may be additionally taken into consideration to determine the delay time DELL For instance, the delay time DELi may be determined depending upon whether a positive forward drive torque or a negative reverse drive torque is transmitted to the mechanically operated step-variable transmission portion 20, and/or whether the step-variable transmission portion 20 is automatically shifted or manually shifted, or on the basis of the temperature toil of the working fluid used for the hydraulic control unit 54.

If an affirmative determination is obtained in the step S9 upon detection of the moment of initiation of the inertia phase of the shift-up action to the target AT gear position, in other words, when the delay time DELi has passed from the point of time t2, the control flow goes to a step S10 to generate the command to establish the target overall speed position, that is, the overall sixth speed position. Accordingly, the reduction of the engine speed $\omega e$ as a result of the shift-up action to the overall sixth speed position and the reduction of the input speed $\omega i$ (MG2 speed $\omega m$) as a result of the shift-up action from the first speed AT gear position to the second speed AT gear position take place concurrently with each other (overlap each other), irrespective of the difference between the control response time tri of the shift-up action to the overall sixth speed position and the control response time trm of the shift-up action to the second AT gear position. In the example of the time chart of FIG. 12 in which the overall third speed position has been established as the intermediate overall speed position according to the command generated in the step S8, the shift-up action from the overall third speed position to the overall sixth speed position takes place concurrently with the shift-up action from the first speed AT gear position to the second speed AT gear position. In the example of the time chart of FIG. 13 in which the overall fifth speed position has been established as the intermediate overall speed position according to the command generated in the step S8, the shift-up action from the overall fifth speed position to the overall sixth speed position takes place concurrently with the shift-up action from the first speed AT gear position to the second speed AT gear position. In the example of the time chart of FIG. 14 in which the vehicular automatic transmission 40 is shifted up from the overall first speed position directly to the overall sixth speed position according to the command generated. In the step S8, the shift-up action of the vehicular automatic transmission 40 is no longer implemented and thus, steps S9 and S10 are skipped.

In the shifting control apparatus (in the form of the electronic control device 80) for the vehicular automatic transmission 40, which is configured according to the present embodiment, the plurality of overall speed positions of the vehicular automatic transmission 40 having the respective different speed ratios γt of the engine speed ωe to the output speed ωo of the mechanically operated step-variable transmission portion 20 are established by controlling the electrically controlled continuously variable transmission portion 18, so that the engine speed ωe is variable in steps by shifting the vehicular automatic transmission 40 from one of the overall speed positions to another. Accordingly, the vehicular automatic transmission 40 as a whole can be shifted in a manner like a manner of shifting of a mechanically operated step-variable transmission, as felt by the vehicle operator.

Further, the synchronous control of the shifting actions of the vehicular automatic transmission 40 and the mechanically operated step-variable transmission portion 20 to the respective target overall speed position and gear position is implemented such that the moment of generation of the command to establish the target overall speed position is delayed with respect to the moment of generation of the command to establish the target gear position, so that the shifting actions take place in synchronization with each other, irrespective of the different control response times tri and trm of the shifting actions. Accordingly; the degree of discomfort given to the vehicle operator due to different timings of the two shifting actions and the shifting shock of the mechanically operated step-variable transmission portion 20 is reduced, and the drivability of the vehicle 10 is improved. Namely, the control response time tri of the shifting action of the electrically controlled continuously variable transmission portion 18 is shorter than the control response time trm of the shifting action of the mechanically operated step-variable transmission portion 20, so that simultaneous generation of the commands to establish the target overall speed position and gear position causes an earlier change of the engine speed ωe in the process of the shifting action of the vehicular automatic transmission 40 by the electrically controlled continuously variable transmission portion 18, than a change of the AT input speed ωi in the process of the shifting action of the mechanically operated step-variable transmission portion 20, that is, an earlier moment of initiation of the inertia phase of the shifting action of the vehicular automatic transmission 40 than a moment of initiation of the inertia phase of the shifting action of the step-variable transmission portion 20, whereby the vehicle operator may be given discomfort due to this difference.

In addition, since the shifting actions of the vehicular automatic transmission 40 and the mechanically operated step-variable transmission portion 20 to the target overall speed position and gear position take place in synchronization with each other, the shifting action of the mechanically operated step-variable transmission portion 20 is performed together with a change of the engine speed we, so that the vehicle operator is unlikely to feel uncomfortable with a shifting shock of the step-variable transmission portion 20, even if the shifting shock is generated.

On the other hand, where the shifting action of the vehicular automatic transmission 40 to the target overall speed position is controlled to take place in synchronization with the shifting action of the mechanically operated step-variable transmission portion 20 to the target AT gear position, as described above, the engine speed ωe is kept at a relatively high value until the shift-up action of the step-variable transmission portion 20 is initiated. In this case, there are a risk that the vehicle operator feels that the engine speed ωe is kept at a relatively high value for an excessively long length of time, and a risk of deterioration of the fuel economy of the engine 14. There is also a risk that the vehicle operator feels uncomfortable with a difference of the control response of the synchronous shifting actions of the vehicular automatic transmission 40 and the step-variable transmission portion 20, with respect to the control response of a shifting action of the vehicular automatic transmission 40 which takes place alone without a concurrent shifting action of the step-variable transmission portion 20. In view of these risks, the overall-speed-position shifting control portion 88 of the present shifting control apparatus includes the two-step shifting control portion 90 configured to command the synchronous shifting control portion 98 in the step S8 such that the vehicular automatic transmission 40 performs the shift-up action from the present overall speed position to the target overall speed position through the selected intermediate overall speed position. Thus, the automatic transmission 40 is initially shifted up to the intermediate overall speed position before it is eventually shifted up to the target overall speed position, so that the engine speed me is lowered at an earlier point of time, whereby the risk of the vehicle operator feeling that the engine speed ωe is kept at the relatively high value for the excessively long length of time, and the risk of deterioration of the fuel economy of the engine 14 are reduced, together with an improvement of the drivability of the vehicle 10.

The shifting control apparatus according to the present embodiment is further configured such that the two-step shifting determining portion 92 determines in the steps S3 and S4 whether the vehicular automatic transmission 40 should be initially shifted to the intermediate overall speed position. This determination is made according to the predetermined condition for implementing the two-step shifting control. The two-step shifting control is implemented only where there is the risk of the vehicle operator feeling that the engine speed ωe is kept at the relatively high value for the excessively long length of time, or the risk of deterioration of the fuel economy of the engine 14, in the following cases, for example: where the mechanically operated step-variable transmission portion 20 is shifted up as a result of the releasing operation of the accelerator pedal to its OFF state; where the shifting action of the step-variable transmission portion 20 has a relatively long control response time due to the working fluid temperature toil lower than the predetermined lower limit; where the speed of releasing of the accelerator pedal is higher than the predetermined upper limit; where the amount of reduction of the operation amount θacc of the accelerator pedal is larger than the predetermined upper limit; and where the operation amount θacc of the accelerator pedal after its releasing operation is smaller than the predetermined lower limit. Accordingly it is possible to reduce the risk of the vehicle operator feeling that the engine speed ωe is kept at the relatively high value for the excessively long length of time, and the risk of deterioration of the fuel economy of the engine 14, while adequately maintaining a high degree of drivability of the vehicle 10 owing to the synchronous shifting actions of the vehicular automatic transmission 40 and the mechanically operated step-variable transmission portion 20.

The shifting control apparatus according to the present embodiment is also configured such that the intermediate overall speed position is selected in the steps S5-S7 according to the running state of the vehicle 10, so that it is possible to improve the drivability of the vehicle 10 owing to the synchronous shifting actions of the vehicular automatic transmission 40 and the mechanically operated step-variable transmission portion 20, and to reduce the risk of the vehicle operator feeling the engine speed ωe kept at the relatively high value for the excessively long length of time, and the risk of deterioration of the fuel economy of the engine 14, so as to assure a good balance between the improvement of the vehicle drivability and the reduction of those risks, according to the running state of the vehicle 10. The risk of the vehicle operator feeling the engine speed ωe kept at the relatively high value for the excessively long length of time is high, so that the degree of requirement to prevent the engine speed ωe from being kept at the relatively high value for the excessively long length of time as felt by the vehicle operator is high, in the following cases, for example: where the speed of releasing of the accelerator pedal is relatively high; where the amount of reduction of the operation amount θacc of the accelerator pedal is relatively large; and where the operation amount θacc of the accelerator pedal after its releasing operation is relatively small. Accordingly, the amount of reduction of the engine speed ωe in the process of the shifting action to the intermediate overall speed position can be adjusted, and the drivability of the vehicle 10 can be improved by the synchronous shifting actions of the vehicular automatic transmission 40 and the mechanically operated step-variable transmission portion 20, while at the same time the risk of the vehicle operator feeling the engine speed ωe kept at the relatively high value for the excessively long length of time can be adequately reduced according to the state of releasing of the accelerator pedal, since the intermediate overall speed position selecting portion 94 is configured to select the intermediate overall speed position such that the selected intermediate overall speed position is closer to the target overall speed position when the degree of requirement to prevent the engine speed ωe from being kept at the relatively high value for the excessively long length of time as felt by the vehicle operator is relatively high than when the degree of requirement is relatively low.

The intermediate overall speed position selecting portion 94 is basically configured to select the intermediate overall speed position from the overall speed positions assigned to the present AT gear position, so that the vehicular automatic transmission 40 can be shifted from the intermediate overall speed position to the target overall speed position according to the table of FIG. 6, in synchronization with the shifting action of the mechanically operated step-variable transmission portion 20. Accordingly, it is possible to reduce the risk of the vehicle operator feeling the engine speed ωe kept at the relatively high value for the excessively long length of time, in the process of the shifting action to the intermediate overall speed position, and the risk of deterioration of the fuel economy of the engine 14, while assuring a high degree of drivability of the vehicle 10 with a reduced risk of generation of the shifting shock. On the other hand, the intermediate overall speed position selecting portion 94 selects the intermediate overall speed position outside the range assigned to the AT gear position established prior to the synchronous shifting actions, to reduce the risk of the vehicle operator feeling the engine speed ωe kept at the relatively high value for the excessively long length of time, with higher priority, rather than to improve the vehicle drivability with a reduced risk of generation of the shifting shock in the process of the synchronous shifting actions, where the degree of requirement to prevent the engine speed ωe from being kept at the relatively high value for the excessively long length of time as felt by the vehicle operator is relatively high, namely, in the following cases, for example: when the operating sound of the engine 14 is easily audible at a low running speed of the vehicle 10; where the engine speed ωe is relatively high; where the operation amount θacc of the accelerator pedal after its releasing operation is smaller than the predetermined lower limit; where the speed of releasing of the accelerator pedal is higher than the predetermined upper limit; where the amount of reduction of the operation amount θacc of the accelerator pedal is larger than the predetermined upper limit; and where the shifting action of the mechanically operated step-variable transmission portion 20 to the target AT gear position has a relatively long control response time which causes the engine speed ωe to be kept at the relatively high value for the excessively long time as felt by the vehicle operator (where the step-variable transmission portion 20 is shifted up as a result of a releasing operation of the accelerator pedal to its OFF state). Accordingly, the engine speed ωe is rapidly lowered in the process of the shifting action to the intermediate overall speed position, so that it is possible to adequately reduce the risk of the vehicle operator feeling the engine speed toe kept at the relatively high value for the excessively long length of time, and the risk of deterioration of the fuel economy of the engine 14.

The intermediate overall speed position selecting portion 94 is further configured to determine in the step S6 whether there is a high risk of generation of a shifting shock of the mechanically operated step variable transmission portion 20. If the affirmative determination is obtained in the step S6, the selection of the intermediate overall speed position is limited in the step S7 within the range of the overall speed positions assigned to the AT gear position established prior to the shifting action of the step-variable transmission portion 20, in order to reduce the risk of deterioration of the vehicle drivability due to the shifting shock, with higher priority, rather than to reduce the risk of deterioration in the vehicle operator feeling and the risk of deterioration of the fuel economy of the engine 14 with the engine speed ωe kept at the relatively high value for the relatively long length of time. Accordingly, the shifting action of the vehicular automatic transmission 40 is suitably performed in synchronization with the shifting action of the step-variable transmission portion 20, such that the engine speed ωe is lowered so as to adequately reduce the risk of deterioration of the vehicle drivability due to the shifting shock, while reducing the risk of the vehicle operator feeling the engine speed ωe kept at the relatively high value for the excessively long length of time in the process of the shifting action to the intermediate overall speed position.

Further, the two-step shifting commanding portion 96 is configured to command the vehicular automatic transmission 40 to be shifted up to the intermediate overall speed position, immediately after the moment of determination to shift up the vehicular automatic transmission 40 to the target overall speed position in step S8. Accordingly, when the vehicular automatic transmission 40 is commanded to be shifted up as a result of a releasing operation of the accelerator pedal or an operation of a manually operated member, the vehicular automatic transmission 40 is immediately shifted up to the intermediate overall speed position, and the engine speed ωe is rapidly lowered, so that it is possible to adequately reduce the risk of the vehicle operator feeling the engine speed ωe kept at the relatively high value for the excessively long length of time, and the risk of deterioration of the fuel economy of the engine 14.

It is to be understood that the embodiment described above is given for illustrative purpose only, and that the present invention may be embodied with various changes and improvements which may occur to these skilled in the art.

NOMENCLATURE OF ELEMENTS

14: Engine (Drive power source)
18: Electrically controlled continuously variable transmission portion
20: Mechanically operated step-variable transmission portion
28: Drive wheels
30: Intermediate power transmitting member
40: Vehicular automatic transmission
80: Electronic control device (Shifting control apparatus)
88: Overall-speed-position shifting control portion
90: Two-step shifting control portion
92: Two-step shifting determining portion
94: Intermediate overall speed position selecting portion
96: Two-step shifting commanding portion
98: Synchronous shifting control portion
MG1: First motor/generator (Differential motor/generator)
ωe: Engine speed (Operating speed of drive power source)
ωo: Output speed
ωm: MG2 speed (Rotating speed of intermediate power transmitting member)
θacc: Accelerator pedal operation amount
toil: Working fluid temperature
tri: Overall-speed-position shifting response time
trm: AT-gear-position shifting response time

What is claimed is:

1. A shifting control apparatus for a vehicular automatic transmission having (a) an electrically controlled continuously variable transmission portion configured to transmit a rotary motion of a drive power source to an intermediate power transmitting member such that a speed ratio of an operating speed of the drive power source to a rotating speed of the intermediate power transmitting member is continuously varied with a torque control by a differential motor/generator, and (b) a mechanically operated step-variable transmission portion which is disposed between the intermediate power transmitting member and drive wheels of a vehicle, and which has a plurality of mechanically established gear positions having respective different ratios of the rotating speed of the intermediate power transmitting member to an output speed of the step-variable transmission portion, the shifting control apparatus comprising:

an overall-speed-position shifting control portion configured to control the electrically controlled continuously variable transmission portion, so as to establish a plurality of overall speed positions of the vehicular automatic transmission having respective different values of a speed ratio which is a ratio of the operating speed of the drive power source to an output speed of the mechanically operated step-variable transmission portion, wherein the overall-speed-position shifting control portion includes:

a multiple-step shifting control portion configured to command the vehicular automatic transmission to be shifted up to at least one intermediate overall speed position intermediate between a present one of the plurality of overall speed positions and a target overall speed position of the plurality of overall speed positions; and a synchronous shifting control portion configured to implement a synchronous control of a shifting action of the vehicular automatic transmission from the at least one intermediate overall speed position to the target overall speed position and a shifting action of the mechanically operated step-variable transmission portion to a target gear position of the plurality of gear positions, such that a moment of generation of a command to establish the target overall speed position is delayed with respect to a moment of generation of a command to establish the target gear position, so that the shifting actions of the vehicular automatic transmission and the mechanically operated step-variable transmission portion take place in synchronization with each other, irrespective of different control response times of the shifting actions.

2. The shifting control apparatus according to claim 1, wherein the multiple-step shifting control portion includes a multiple-step shifting determining portion configured to determine, according to a predetermined condition for implementing a multiple-step shifting control, whether the vehicular automatic transmission should be initially shifted to the at least one intermediate overall speed position.

3. The shifting control apparatus according to claim 2, wherein the predetermined condition for implementing the multiple-step shifting control is formulated to implement the multiple-step shifting control to initially shift the vehicular automatic transmission to the at least one intermediate overall speed position, where a speed of releasing of an accelerator pedal provided on the vehicle is equal to or higher than a predetermined upper limit, where an amount of reduction of the operation amount of the accelerator pedal is equal to or larger than a predetermined upper limit, or where the operation amount after the releasing operation of the accelerator pedal is equal to or smaller than a predetermined lower limit.

4. The shifting control apparatus according to claim 2, wherein the mechanically operated step-variable transmission portion is hydraulically shifted to a selected one of the gear positions with a working fluid, and the predetermined condition for implementing the multiple-step shifting control is formulated to implement the multiple-step shifting control to initially shift the vehicular automatic transmission to the at least one intermediate overall speed position, where a temperature of the working fluid is equal to or lower than a predetermined lower limit.

5. The shifting control apparatus according to claim 1, wherein the multiple-step shifting control portion includes an intermediate overall speed position selecting portion configured to select the at least one intermediate overall speed position according to a running state of the vehicle, where the overall speed positions are present between the present and target overall speed positions.

6. The shifting control apparatus according to claim 5, wherein the intermediate overall speed position selecting portion selects the at least one intermediate overall speed position, according to the speed of releasing of the accelerator pedal, the amount of reduction of the operation amount of the accelerator pedal, and the operation amount of the accelerator pedal after its releasing operation as the running state of the vehicle, such that the selected at least one intermediate overall speed position is closer to the target overall speed position when the speed of releasing of the accelerator pedal is relatively high than when the speed of releasing is relatively low, when the amount of reduction of the accelerator pedal is relatively large than when the amount of reduction is relatively small, or when the operation amount of the accelerator pedal after its releasing operation is relatively small than when the operation amount is relatively large.

7. The shifting control apparatus according to claim 5, wherein the number of the overall speed positions of the vehicular automatic transmission is larger than the number of the gear positions of the mechanically operated step-variable transmission portion, and a plurality of the overall speed positions are assigned to one of the gear positions, and wherein the intermediate overall speed position selecting portion selects the at least one intermediate overall speed position from the overall speed positions assigned to the present gear position, in a running state of the vehicle in which a shifting shock of the mechanically operated step-variable transmission portion is likely to be generated.

8. The shifting control apparatus according to claim 1, wherein the number of the overall speed positions of the vehicular automatic transmission is larger than the number of the gear positions of the mechanically operated step-variable transmission portion, and a plurality of the overall speed positions are assigned to one of the gear positions, and wherein the intermediate overall speed position selecting portion selects the at least one intermediate overall speed position outside a range of the overall speed positions assigned to the present gear position, in a running state of the vehicle in which an operator of the vehicle is likely to feel that the operating speed of the drive power source is kept at a relatively high value for an excessively long length of time.

9. The shifting control apparatus according to claim 1, wherein the multiple-step shifting control portion includes a multiple-step shifting commanding portion configured to command the vehicular automatic transmission to be shifted up to the at least one intermediate overall speed position, at a predetermined timing after a moment of determination to shift up the vehicular automatic transmission to the target overall speed position.

10. The shifting control apparatus according to claim 1, wherein the multiple-step shifting control portion includes a multiple-step shifting commanding portion configured to command the vehicular automatic transmission to be shifted up to the at least one intermediate overall speed position immediately after a moment of determination to shift up the vehicular automatic transmission to the target overall speed position.

* * * * *